US010436941B2

(12) United States Patent
Musso

(10) Patent No.: US 10,436,941 B2
(45) Date of Patent: Oct. 8, 2019

(54) IMAGE AND/OR RADIO SIGNALS CAPTURING PLATFORM

(71) Applicant: ALTEC S.P.A., Turin (IT)

(72) Inventor: Ivano Musso, Turin (IT)

(73) Assignee: ALTEC S.p.A., Turin (IT)

( * ) Notice: Subject to any disclaimer, the term of this patent is extended or adjusted under 35 U.S.C. 154(b) by 288 days.

(21) Appl. No.: 15/326,764

(22) PCT Filed: Jul. 17, 2015

(86) PCT No.: PCT/IB2015/055429
§ 371 (c)(1),
(2) Date: Jan. 17, 2017

(87) PCT Pub. No.: WO2016/009402
PCT Pub. Date: Jan. 21, 2016

(65) Prior Publication Data
US 2017/0205536 A1    Jul. 20, 2017

(30) Foreign Application Priority Data

Jul. 17, 2015  (IT) .......................... RM2014A000398

(51) Int. Cl.
| | | |
|---|---|---|
| G01W 1/08 | (2006.01) | |
| G01C 11/02 | (2006.01) | |
| G03B 15/00 | (2006.01) | |
| G03B 17/56 | (2006.01) | |
| B63B 35/00 | (2006.01) | |
| B64D 1/12 | (2006.01) | |
| B64D 47/08 | (2006.01) | |

(Continued)

(52) U.S. Cl.
CPC .............. *G01W 1/08* (2013.01); *B63B 35/00* (2013.01); *B64D 1/12* (2013.01); *B64D 47/08* (2013.01);

(Continued)

(58) Field of Classification Search
CPC ......... G01W 1/08; B63B 35/00; G01S 13/953
See application file for complete search history.

(56) References Cited

U.S. PATENT DOCUMENTS

| 5,897,223 A * | 4/1999 | Tritchew .............. G03B 15/006 |
| | | 348/144 |
| 2007/0046448 A1* | 3/2007 | Smitherman .......... G01C 11/02 |
| | | 340/431 |

(Continued)

FOREIGN PATENT DOCUMENTS

| JP | 2000-346600 | 12/2000 |
| WO | WO 97/35166 | 9/1997 |
| WO | WO 2005/003011 | 1/2005 |

OTHER PUBLICATIONS

International Search Report for PCT/IB2015/055429 dated Feb. 23, 2016, 5 pages.

(Continued)

*Primary Examiner* — Marcus E Windrich
(74) *Attorney, Agent, or Firm* — Nixon & Vanderhye P.C.

(57) ABSTRACT

A platform configured to acquire images and/or radio signals and to be carried by lightweight aircraft includes housing structure that houses an acquisition sensor to acquire still and/or moving images and radio signals receivers to acquire radio signals. The housing is configured to be coupled to light aviation aircraft. Sensing data is provided from a position and motion sensing unit coupled to the sensor. The processing structure controls and/or programs, on the basis of the received sensing data, each sensor to enable the sensor to acquire images and/or radio signals when the sensor is in a determined position and is subject to oscillations below a maximum velocity value. A rate of variation of actual aiming of the sensor is not larger in absolute value than a respective maximum value of offset variation rate with respect to an ideal aiming, so as to ensure focusing on an aimed area.

14 Claims, 14 Drawing Sheets

(51) Int. Cl.
    *G01S 13/95*    (2006.01)
    *H04N 5/225*    (2006.01)
    *H04N 5/232*    (2006.01)
    *H04N 7/18*     (2006.01)
    *G05D 1/00*     (2006.01)
    *G03B 17/08*    (2006.01)

(52) U.S. Cl.
    CPC ............ *G01C 11/02* (2013.01); *G01S 13/953* (2013.01); *G01S 13/956* (2013.01); *G03B 15/006* (2013.01); *G03B 17/561* (2013.01); *G05D 1/0094* (2013.01); *H04N 5/2252* (2013.01); *H04N 5/23238* (2013.01); *H04N 7/18* (2013.01); *B64C 2201/022* (2013.01); *B64C 2201/125* (2013.01); *B64C 2201/127* (2013.01); *G03B 17/08* (2013.01)

(56) References Cited

U.S. PATENT DOCUMENTS

| | | | | |
|---|---|---|---|---|
| 2010/0305782 A1* | 12/2010 | Linden | ............... | G01C 11/025 701/3 |
| 2012/0031119 A1* | 2/2012 | Ahmad | ............... | B64B 1/50 62/79 |
| 2012/0081232 A1* | 4/2012 | Lee | ............... | G01W 1/08 340/870.1 |
| 2012/0105634 A1* | 5/2012 | Meidan | ............... | G08B 13/1965 348/143 |
| 2014/0009324 A1* | 1/2014 | Ranney | ............... | G01S 13/534 342/161 |
| 2014/0191893 A1* | 7/2014 | Fox | ............... | G01S 13/0218 342/27 |
| 2014/0197280 A1* | 7/2014 | Smith | ............... | B64C 3/10 244/35 R |
| 2014/0210636 A1* | 7/2014 | Nam | ............... | H04W 52/283 340/870.1 |
| 2014/0353424 A1* | 12/2014 | Ratner | ............... | B64B 1/62 244/98 |
| 2015/0138355 A1* | 5/2015 | Tillotson | ............... | G01N 15/06 348/144 |

OTHER PUBLICATIONS

International Preliminary Report on Patentability for PCT/IB2015/055429 dated Oct. 17, 2016, 42 pages.

* cited by examiner

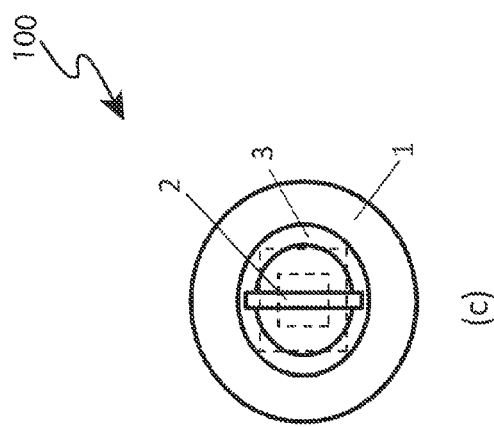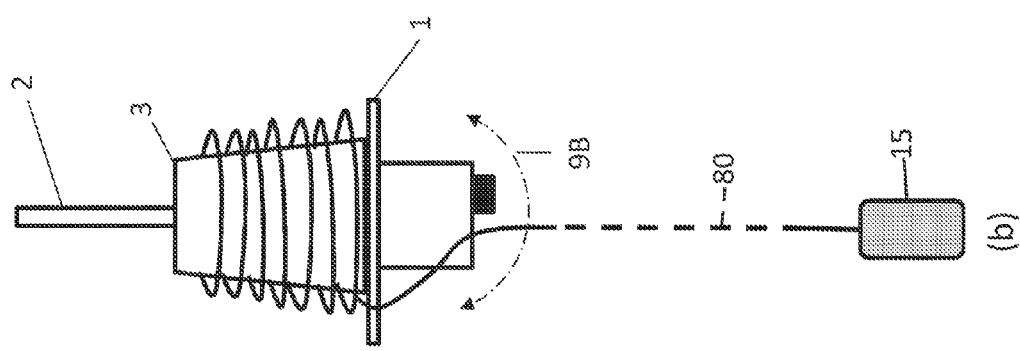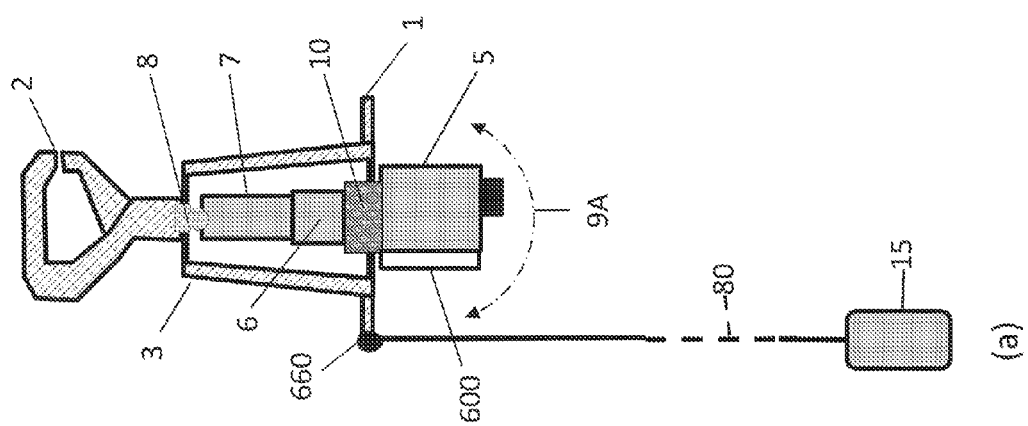
Fig. 1

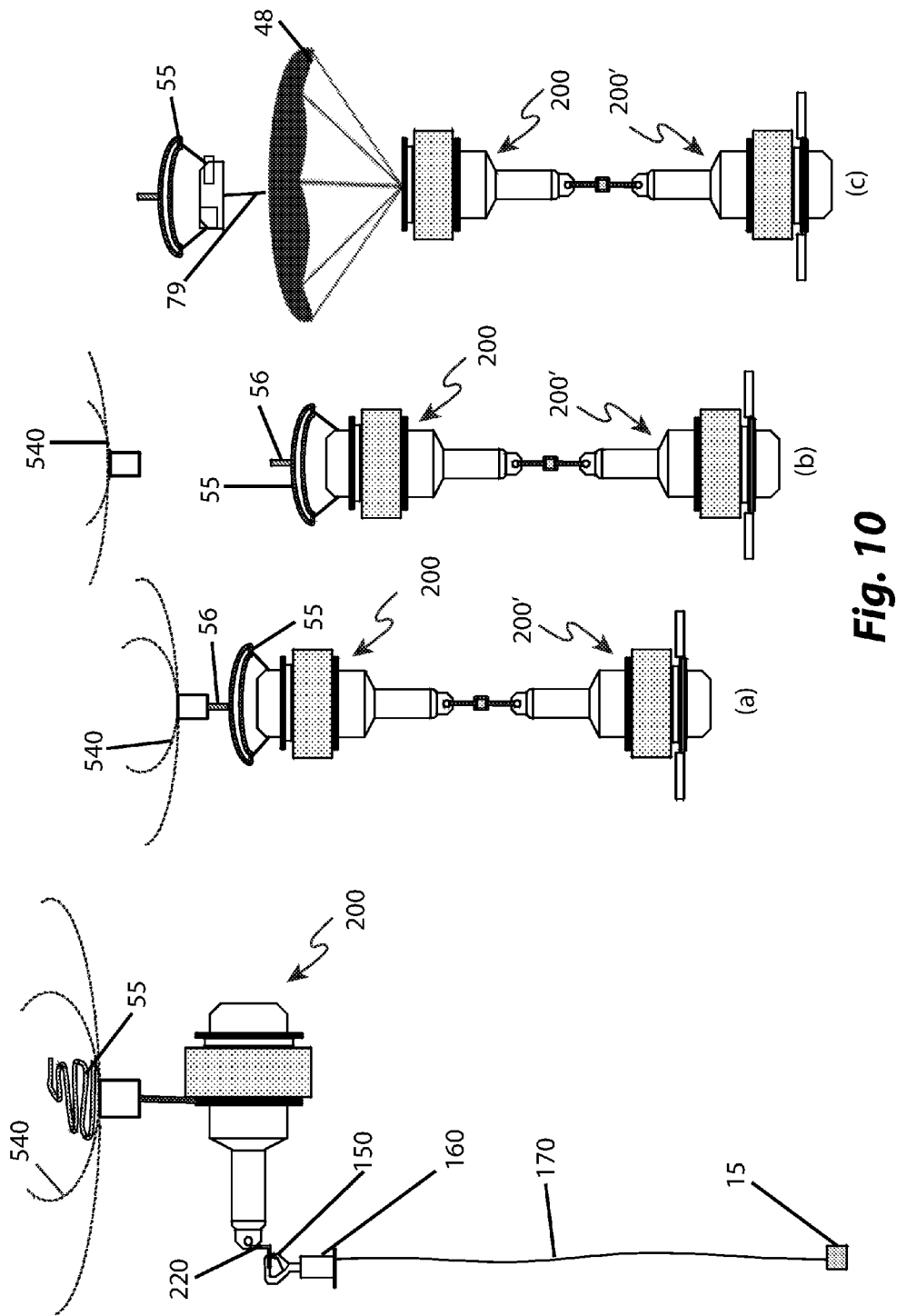

IMAGE AND/OR RADIO SIGNALS CAPTURING PLATFORM

This application is the U.S. national phase of International Application No. PCT/IB2015/055429 filed Jul. 17, 2015 which designated the U.S. and claims priority to IT Patent Application No. RM2014A000398 filed Jul. 18, 2014, the entire contents of each of which are hereby incorporated by reference.

The present invention concerns a platform configured to acquire images and/or radio signals, in particular configured to make photographic and/or video shots and/or acquisition of radio signals, such as for instance radar signals, configured to be carried by lightweight aviation aircrafts, such as carrier balloons, weather balloons, small tethered balloons, ultralight aircrafts, gliders, hot air balloons and the like, that allows in an efficient, effective, reliable, practical, versatile and inexpensive way to professionally and continuously make photographic and/or video shots and/or a radio signal acquisition, possibly allowing a planning and a control of the flight trajectory of the point of shooting (intended, here and hereinafter, as the point from which shots are taken).

Although in the following reference is mainly made to a platform for photographic and/or video shots and/or for radio signal acquisition configured to be carried by carrier weather balloons, it must be understood that the platform according to the invention may be configured to be carried by any light aviation aircraft, such as carrier balloons, small tethered balloons, ultralight aircrafts, gliders, hot air balloons and the like, remaining within the scope of protection as defined in the attached claims.

It is known that photographic and video panoramic shots, as well as acquisitions of radio signals, such as for instance radar signals, are extensively performed by making use of satellites and airplanes. The use of airplanes and helicopters entails resulting high managing costs, with the consequent limitation to an impromptu, rather than continuous, use on the part of few military government agencies or large companies; this means that the possibility of planning in advance the image, or radio signal, acquisition process and the possibility of controlling the same in real time are typically forbidden to the general public.

Recently, model aircrafts and unmanned aircrafts have been used for aerial shots (and radio signal acquisition) reducing managing costs. However, the regulations in force (e.g., see Regulation of the Ente Nazionale per l'Aviazione Civile—ENAC—"Mezzi Aerei a Pilotaggio Remoto" of 16 Dec. 2013, in force in Italy) only permit limited ranges of action to remotely piloted aircrafts, and deny the permission to fly at high altitude and overflights of populated or sensitive areas.

Differently, weather balloons, which carry radiosondes, having a weight of few kilograms (usually 3-6 kg) are subject to a more flexible regulation and have a consolidated and wide market since decades, as proven for instance by document EP1508060 A1. Specific international agreements have permitted a certain operation freedom besides a widespread use of such systems (e.g., see: Aeronautical Information Publication AIP Italia ENAV ENR 5.3.1-3, 27 Jun. 2013; Regolamento Regole dell'Aria ENAC 3 Oct. 2006; FAA Regulations for Kites/Balloons Part 101; ICAO Rules of the Air Annex 2 to the Convention on International Civil Aviation, July 2005).

However, the use of weather balloons for purposes of aerial shots or radio signal acquisition has been made so far without obtaining satisfactory results for their industrial application, but only for experimental purposes in scientific context, for studying devices for stabilising the acquisition sensor, as disclosed by J. Jaworski et al. in *"Innovative Camera Pointing Mechanism for Stratospheric Balloons"*, 20$^{th}$ Symposium on European Rocket and Balloon Programmes and Related Research, October 2011 or for purposes of data relay in civil and military applications.

Consequently, the prior art solutions used for photographic or video panoramic shots and for radio signal acquisition suffer from some drawbacks.

First of all, such solutions do not allow such activities to be professionally and continuously performed in a mode comparable to that currently used on board satellites.

Also, the use of acquisition sensors, such as cameras and radio signal acquisition devices, on board weather balloons has not given satisfactory results because of the not simple combinability of them (i.e. of acquisition sensors and weather balloons).

It is an object of the present invention to allow in an efficient, effective, reliable, practical, versatile and inexpensive way to professionally and continuously make photographic and/or video panoramic shots and/or a radio signal acquisition.

It is still an object of the present invention to allow a planning and a control of the flight trajectory of the point of shooting.

It is a further object of the present invention to also allow to make photographic and/or video shots on the ground or at sea at the end of the flight trajectory.

It is specific subject matter of the present invention a platform for acquiring images and/or radio signals, in particular for photographic and/or video shots and/or for radio signal acquisition, as defined in claim 1.

Further embodiments of the platform according to the invention are defined in the dependent claims.

It is further specific subject matter of the present invention a system of monitoring at least one area, comprising one or more platforms configured to acquire images and/or radio signals according to the invention, comprising a communication device, and at least one ground station configured to communicate with said one or more platforms, the system comprising a computing centre, optionally a distributed one, configured to process and integrate data acquired by said one or more platforms.

The platform according to the invention, thanks to the fact of being light and compact, is configured to be carried by carrier balloons as the weather balloons (in combination with or alternatively to radiosondes), small tethered balloons, ultralight aircrafts, gliders, hot air balloons and similar aircrafts. In particular, the platform allows the acquisition of high resolution images, comparable to satellite and aerial ones, as well as the reliable acquisition of radio signals.

A preferred embodiment of the platform according to the invention is configured to be inserted as additional load in the flight train of a weather balloon. In this regard, it is known that the radiosondes for meteorological purposes are exclusively used for measurements in air during their flight and they consist of devices which are compact, usually having size of about 20×10×20 cm, and light, having a weight usually equal to about 300 gr, suspended through a cable long from 10 to 20 m from balloons of plastic material filled with helium and having diameter at launch of about 1 m. The flight of radiosondes lasts about 2 hours reaching altitudes up to 35 km at which the balloon explodes and the radiosonde falls down while braked by a parachute. The suspension cable is wound in a bobbin of about 15 cm of length that is directly hooked to the balloon base and permits loosing of the cable during the first minute of ascent in a free and spontaneous way as a result of the weight of the radiosonde. The radiosonde is typically not recovered. Some examples of tools for the launch and flight of such radiosondes are disclosed in documents US20130141248 A1, WO2005003011 A1 and U.S. Pat. No. 4,432,502 A. In order to insert a platform according to the invention as additional load in the flight train of a weather balloon, the bobbin for winding the suspension cable of the radiosonde is integrated within the same platform, hence without requiring substantial modifications of the commercial automatic launch systems already available. In this way, the platform implements a versatile apparatus for aerial photographic and/or video shots that may be carried by weather balloons, meeting the weight and technical constraints provided for weather balloons by the international regulations and operators, whereby the platform benefits from the same conditions of use, receiving more flexible permissions with respect to cameras mounted on airplanes, helicopters and unmanned aircrafts.

In particular, the platform according to the invention may be advantageously provided with one or more of the following devices: panoramic cameras, cameras provided with zoom for accurate shooting of the soil or of the sky for astrometry, radio signal receiver, optionally configured to operate as bistatic radar receiver, position and aiming measuring systems, systems of mechanical actuation of aiming and trajectory control, systems of on board calculation and processing and storing of images and/or acquired radio signals, systems of trajectory prediction, redundant or supplementary communication systems, mechanisms allowing to continue the operations of acquisition of images and/or radio signals even on the ground and at sea after the end of the flight. In this regard, the platform according to the invention may be advantageously provided with systems and methods which make use of meteorological forecast data through which it is possible to predict with considerable precision winds and consequent trajectories of stratospheric balloons, so as to notify well in advance of the overflight of a certain geographical area a potential operator or user; such systems and methods may be similar to those disclosed, for instance, by I. Musso et al. in "The HASI Flight Control Strategy", 23rd Internat Symposium on Space Technology and Science, Matsue, Japan, Paper ISTS 2002-m-02, June 2002, by I. Musso et al. in "A Balloon Trajectory Prediction System", 34th COSPAR Scientific Assembly Houston Tex., Oct. 10-19, 2002, Advanced in Space Research 33, 2004, by I. Musso et al. in "Software and methodologies for stratospheric balloons' flight prediction", 3th AIAA Aviation Technology, Integration and Operations Technical Forum, Denver, Colorado, 17-19 Nov. 2003, and by A. Cardillo et al. in "USV test flight by stratospheric balloon: preliminary mission analysis", 35th COSPAR, Paris, France, July 2004.

The embodiments of the platform according to the invention which comprise a plurality of acquisition sensors are configured to control the aiming (i.e. the orientation) and the amplitude of the oscillations of each sensor and to only enable the acquisition of sensors actually aiming a target and/or having an oscillation amplitude not larger than a maximum value.

Some embodiments of the platform according to the invention are provided with mechanical devices (preferably comprising or consisting of actuators) performing two distinct functions: the aiming of the acquisition sensors (e.g. cameras and/or other acquisition optical sensors and/or receivers of radio signals, in particular radar signals) and the control of the trajectory of the weather balloon in ascent and/or of the parachute of the same weather balloon in descent. In this way, the platform according to the invention may execute the identification of a specific target during the first phase of flight of the balloon and possibly the overflight thereof through the control of the trajectory during descent. The acquisition sensors (e.g. cameras) and their devices of aiming are arranged in positions such that they ensure during the flight a great range of the aiming angles in elevation, permitting at the same time both the aiming at the soil and the aiming at the sky for photographic and/or video shots and/or for radio signal acquisition, e.g. for purposes of astrometric scientific nature. In case of splashdown, the platform is configured to assume the typical configuration of a radio-buoy. In this way the great range in elevation of the aiming of the acquisition sensors turns into a great freedom of aiming in azimuth along the horizon line, allowing the acquisition sensors and other on board sensors to be used for continuing the identification and control of targets even for a certain period after the end of the flight.

Other embodiments of the platform according to the invention are provided with sequential burst secondary balloons which permit to slow down the ascent rate and the stay of the main balloon at the medium-low altitudes for a time longer than the typical flight profile of the weather balloons carrying radiosondes, altitudes at which it is possible to perform an more precise acquisition of photographic and/or video images.

Other embodiments of the platform according to the invention are provided with electric motors and propellers and/or rotors and/or ducted fans arranged in vertical and/or horizontal position so as to improve the platform stability, to give a side or vertical thrust so as to permit the flight control and to consequently form an hybrid aircraft between weather balloon and drone.

Further embodiments of the platform according to the invention may be provided with antennas for sending and receiving radio signals at several frequencies and communication devices which are part of a communication system that ensures a full coverage of the flight (with the possibility of calculating and predicting, both on board and on the ground, the flight trajectory for possibly planning overflights of specific target areas) and sending to ground at least part of the images and/or radio signals acquired and possibly processed on board, exploiting supplementary data lines and ensuring reception of information or sending remote commands in real time; in this regard, the platform may be provided with conventional software for executing even in real time image analysis, their combination in order to increase coverage and/or resolution, their precise localisation, focusing, compression and filtering. Data may be advantageously stored even on board for their later analysis in the case where it is possible to proceed with recovering the platform at the end of the flight. In particular, the communication system may optionally comprise a network of ground stations and computing centres capable to process the received information and making them available on the Internet and/or on at least one mobile telephone network, so as to greatly increase the fruitful use of the invention.

When the platform is configured to acquire radio signals, it allows both to determine the position of the platform in flight (or after landing or splashdown), and to recognise terrains or surfaces of particular materials which reflects radio signals differently from how they are reflected by other materials and/or from how they are directly transmitted from the source, such as for instance in case of oil spills at sea, which reflect radio signals differently from water. In this case, a ground station may communicate for instance with a flying platform and may analyse and recognise the differences between a reflected radio signal that is received by the platform and a radio signal directly transmitted from the source (e.g., a satellite TV signal).

As stated, the platform according to the invention allows to make use of the automatic launch stations for radiosondes already available, with a consequent reduction of the managing costs, such as for instance those disclosed in documents US20130141248 A1, WO2005003011 A1 and U.S. Pat. No. 4,432,502 A. The platform according to the invention may be also launched by making use of automatic stations for weather balloons provided with a flexible and extensible camera within which it may be performed the balloon inflation and suitably designed so as to reduce size and be used on board watercrafts or land vehicles. In this regard, several international operators have sites from which balloons are launched daily for sensing of meteorological nature: each of their trajectories cover an area of hundreds of $km^2$, often in proximity of airports, thus densely populated zones and of a certain strategic and/or commercial interest, forbidden to other types of aircrafts.

The present invention will be now described, by way of illustration and not by way of limitation, according to its preferred embodiments, by particularly referring to the Figures of the annexed drawings, in which:

FIG. 1 shows a right side view wherein some internal elements are visible (FIG. 1a), a right side view and a top plan view of a first embodiment of the platform for acquiring images and/or radio signals according to the invention;

Figure 2:
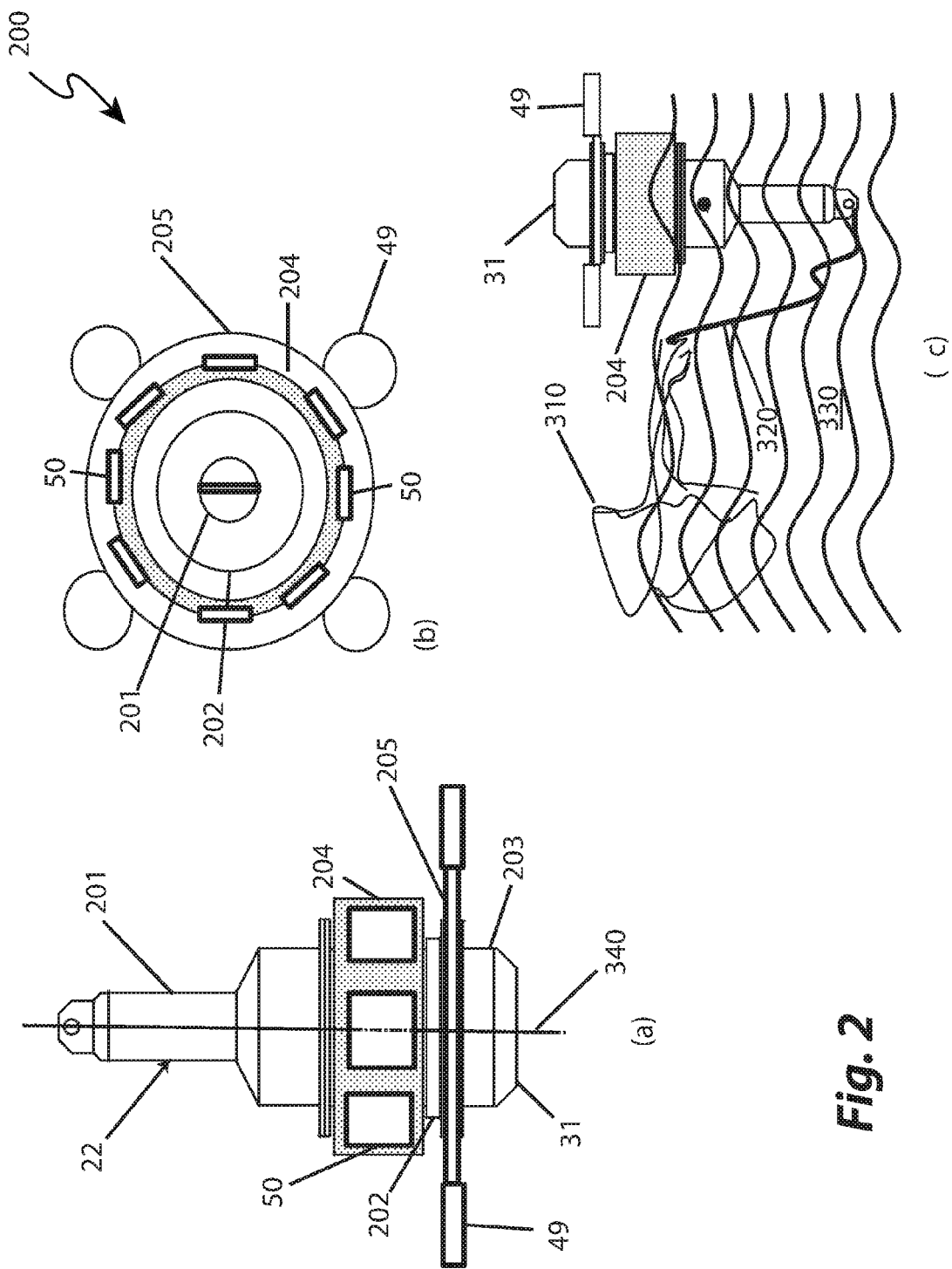
FIG. 2 shows a front view (FIG. 2a) and a plan view (FIG. 2b), wherein some internal components are visible, of a second embodiment of the platform for acquiring images and/or radio signals according to the invention, as well as a side view (FIG. 2c) of the platform of FIG. 2a, connected to a drogue parachute, in water.
Figure 6:
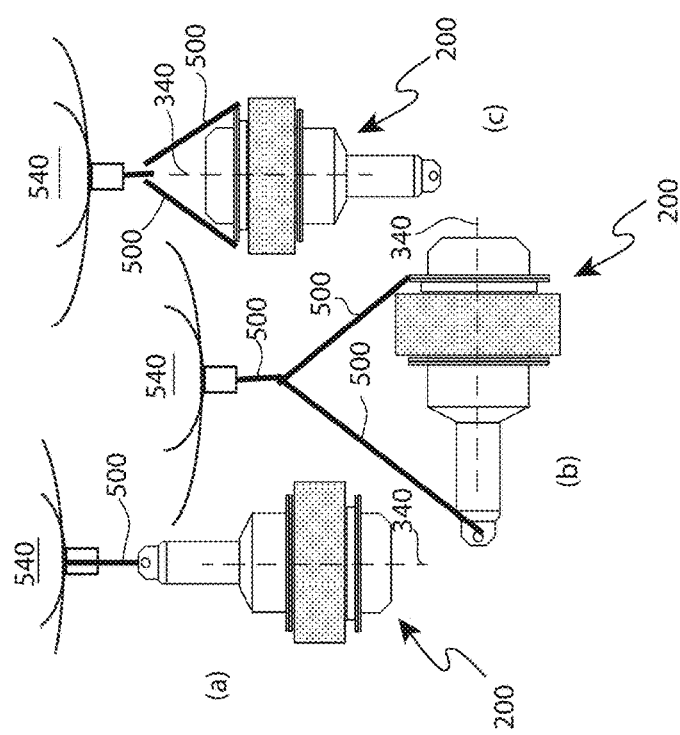
Figure 7:
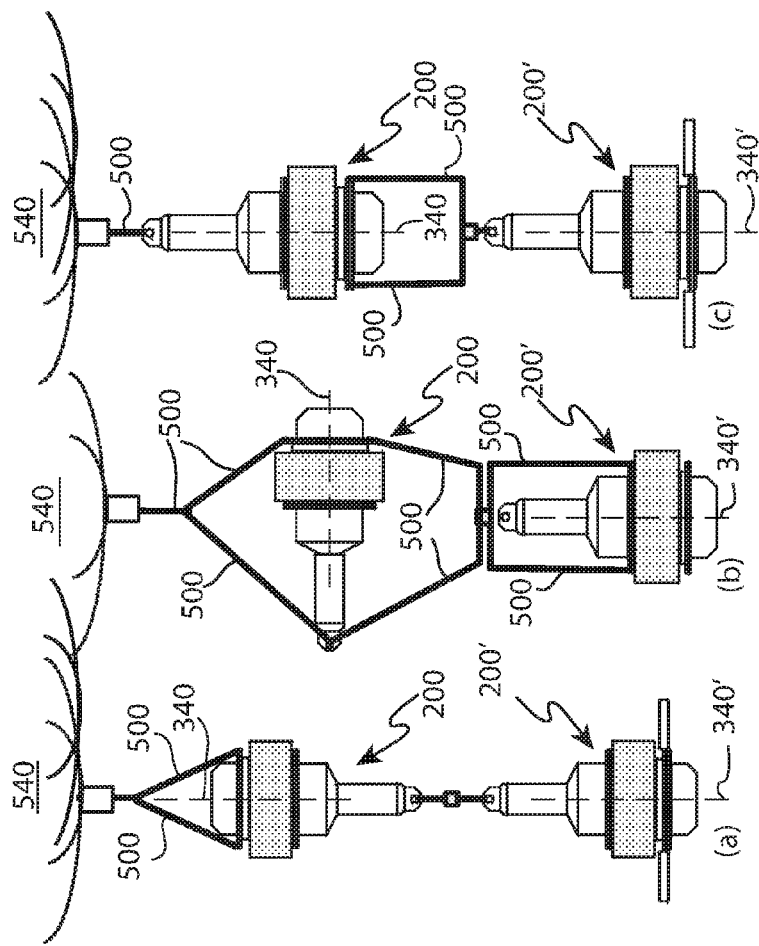
Figure 8:
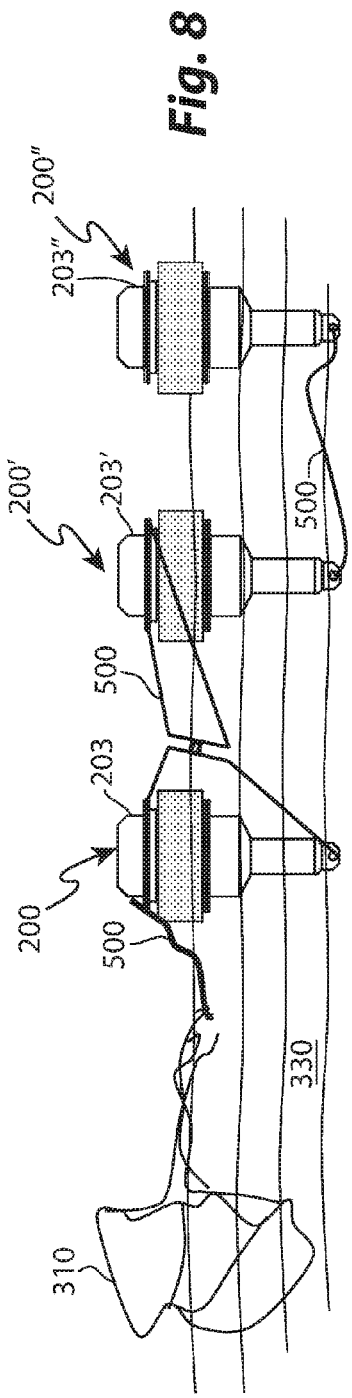
Figure 11:
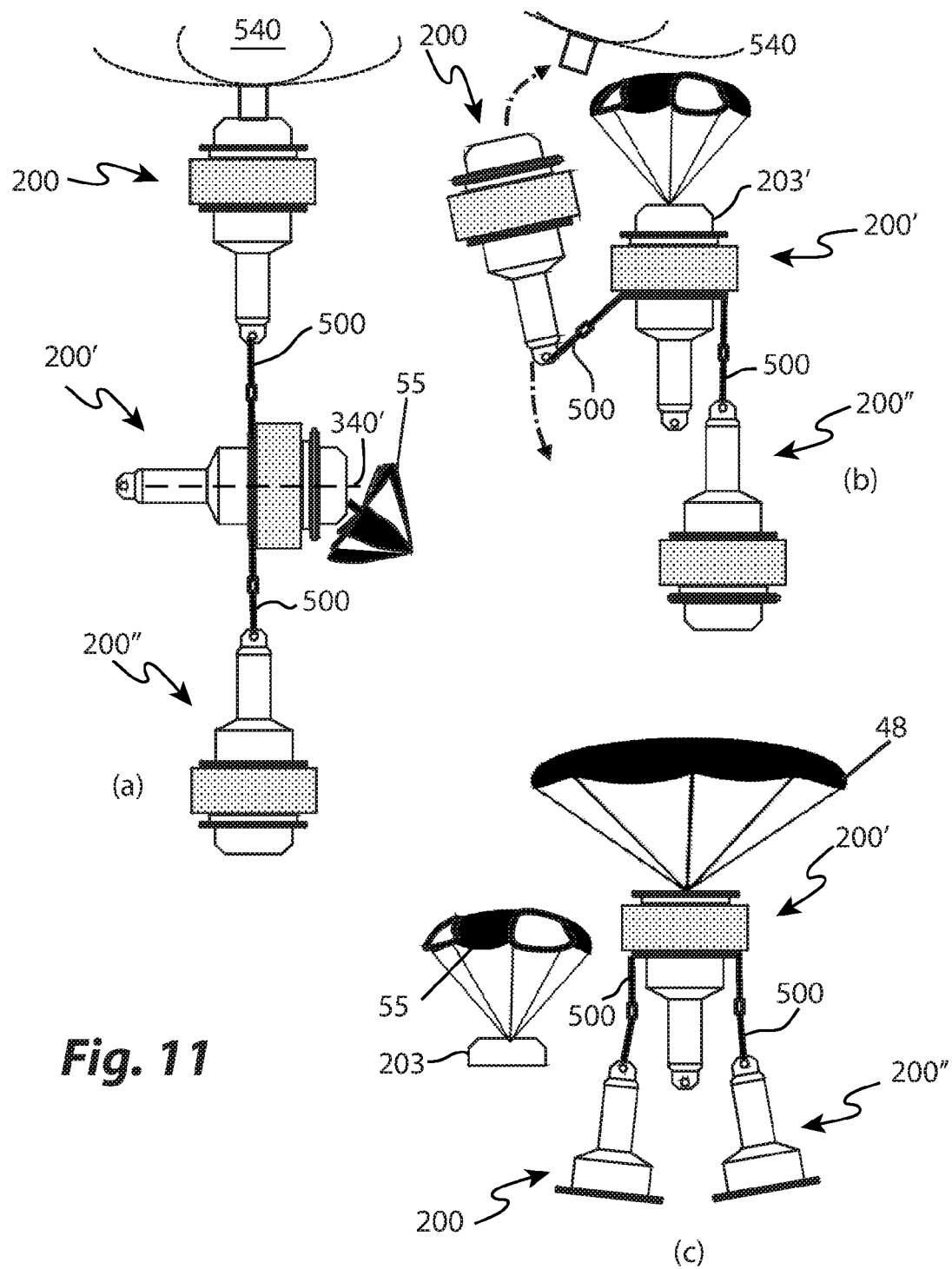
Figure 12:
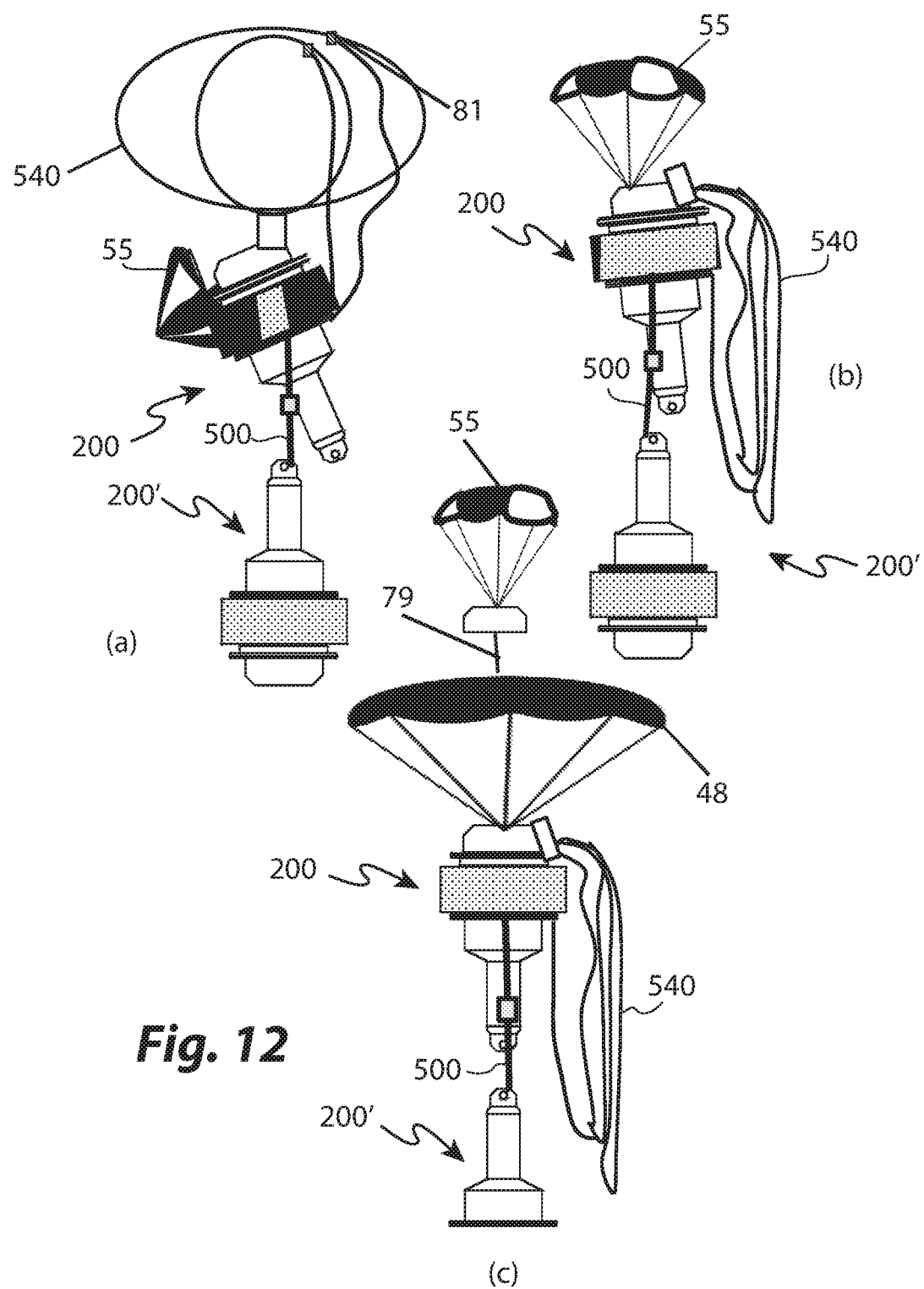
Figure 13:
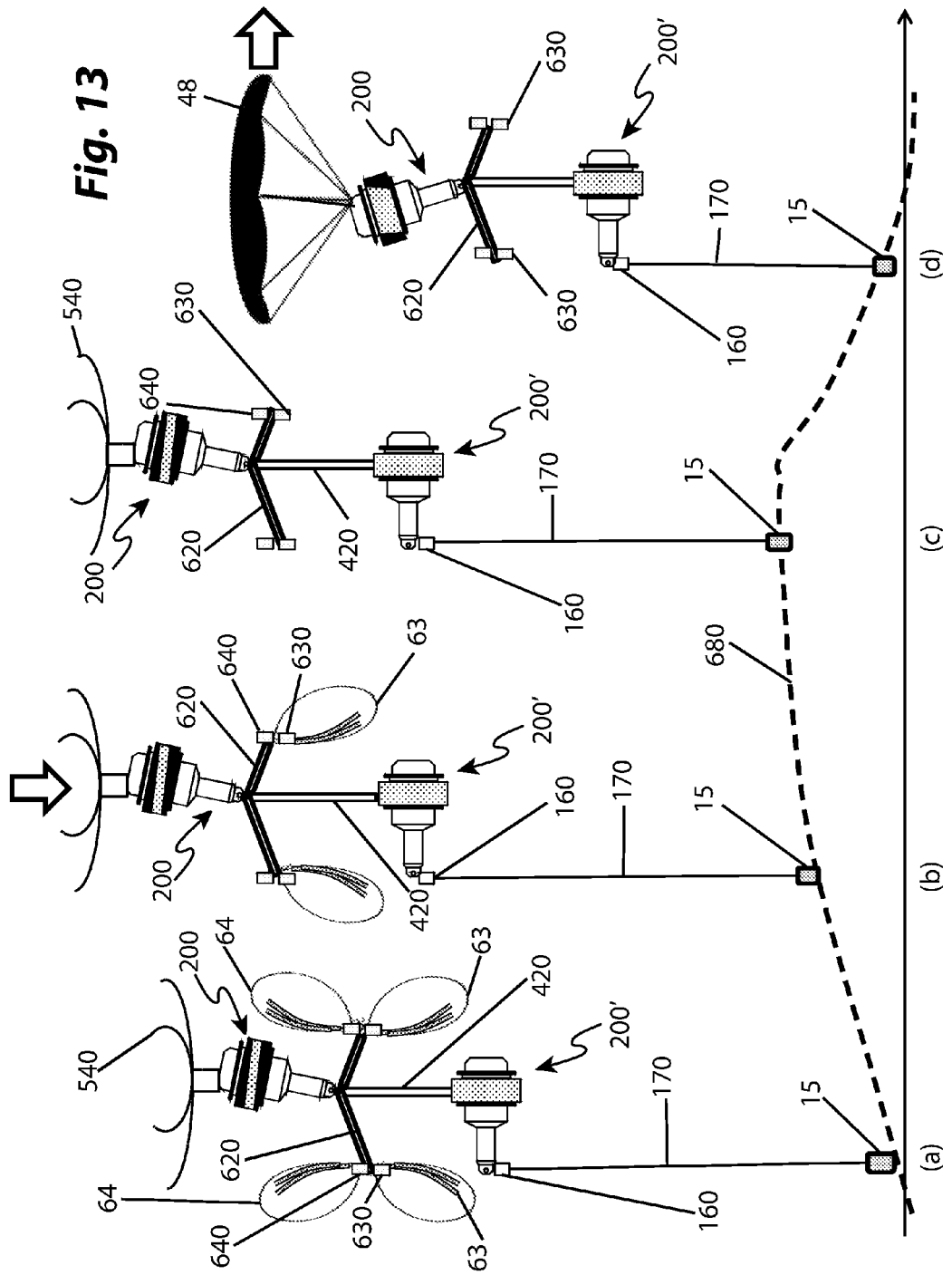
Figure 14:
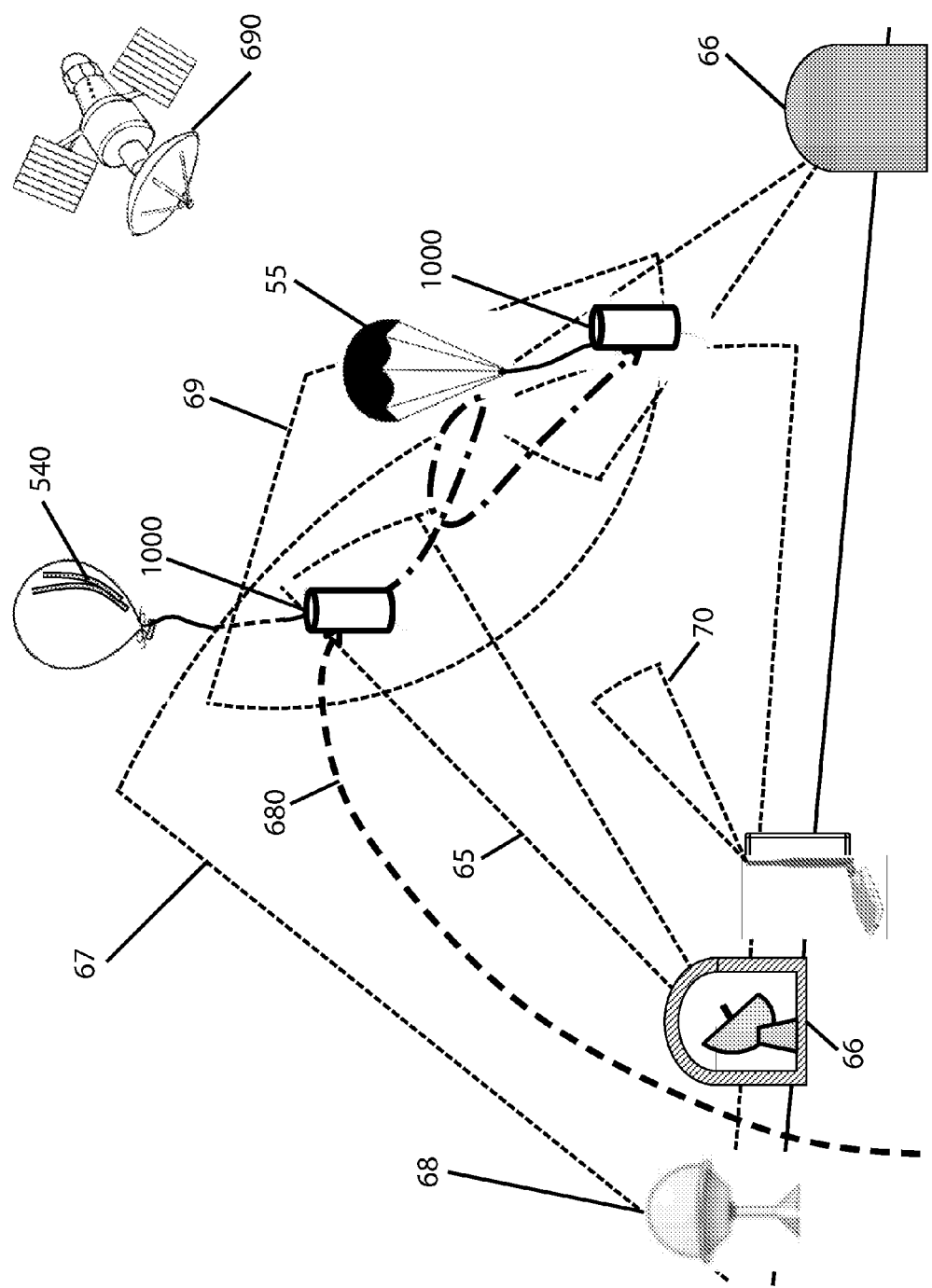
Figure 15:
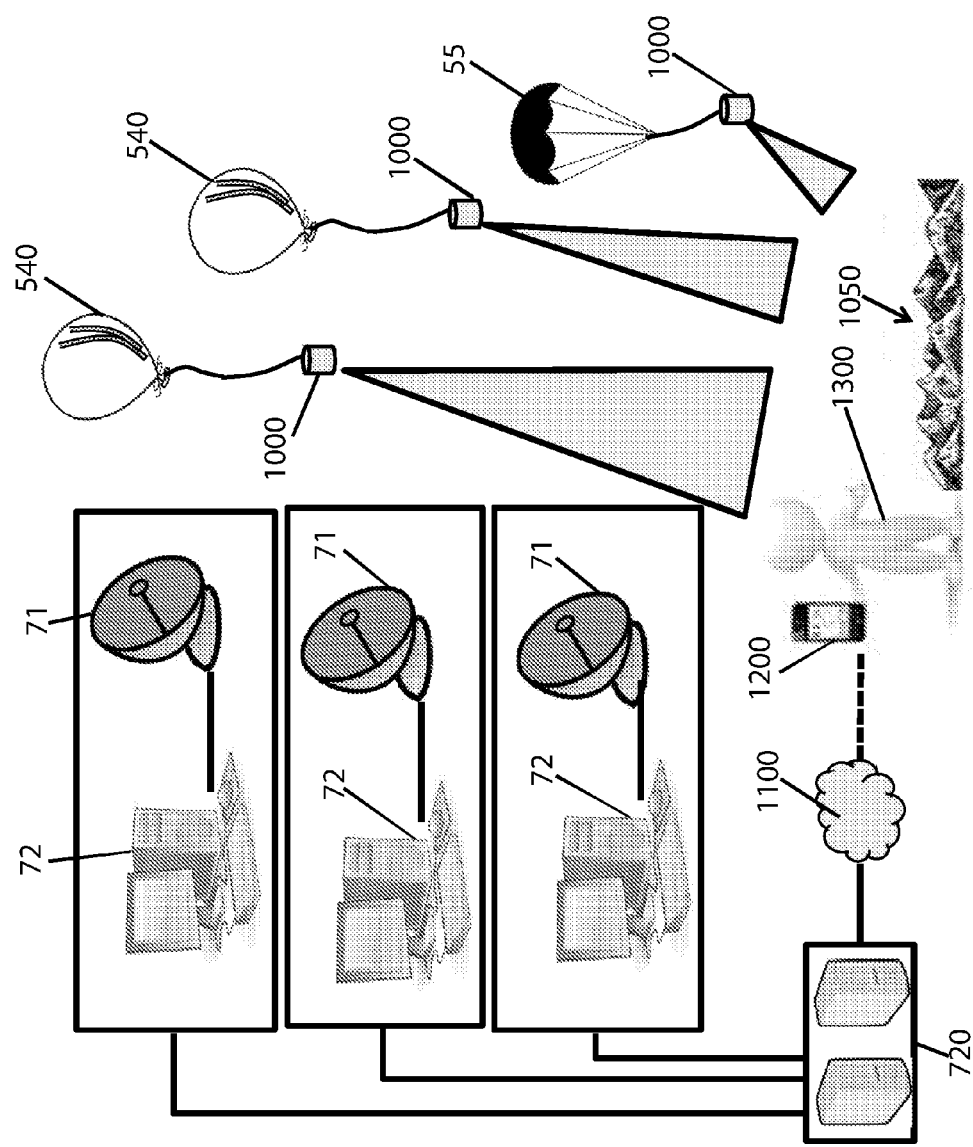
Figure 16:
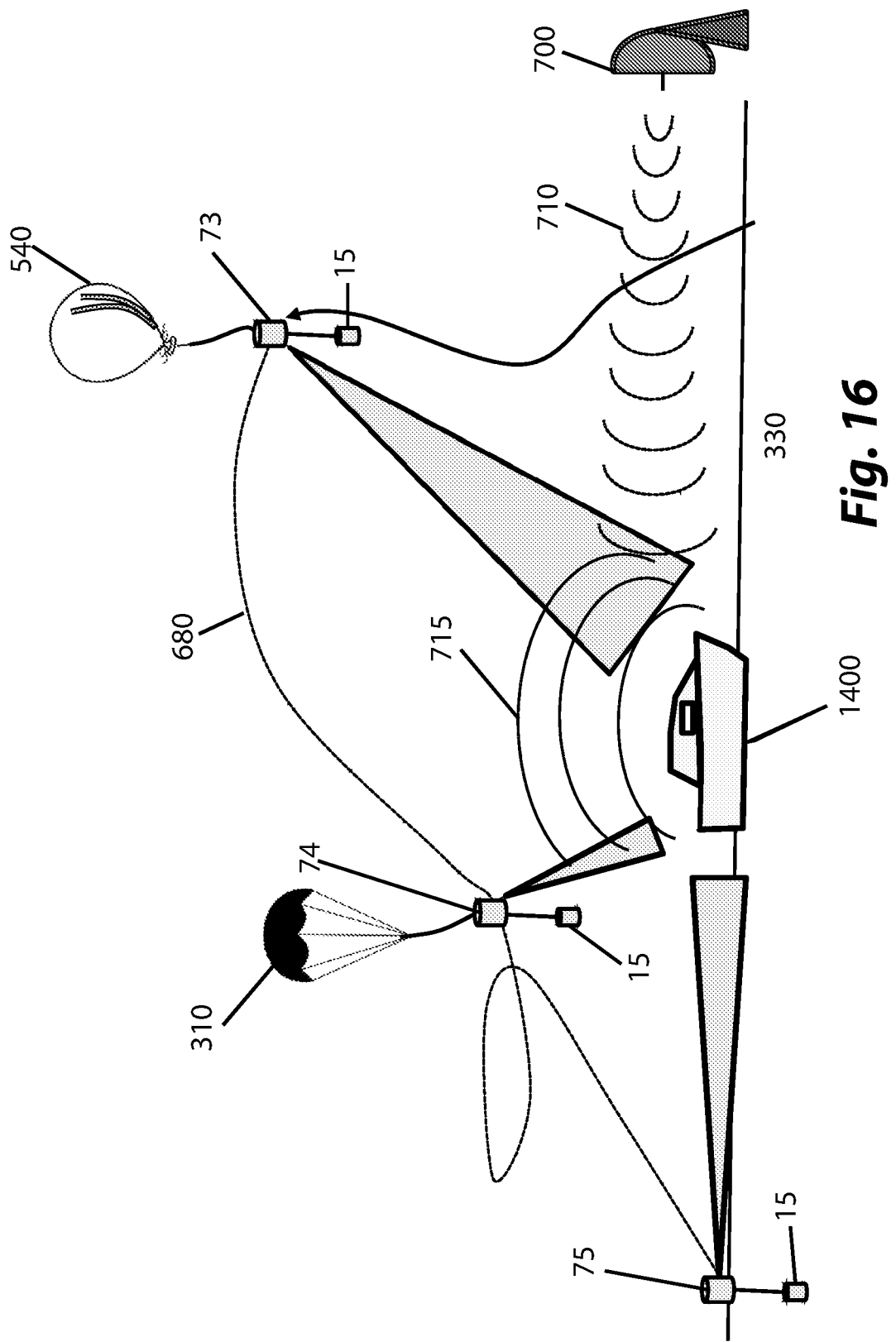
Figure 17:
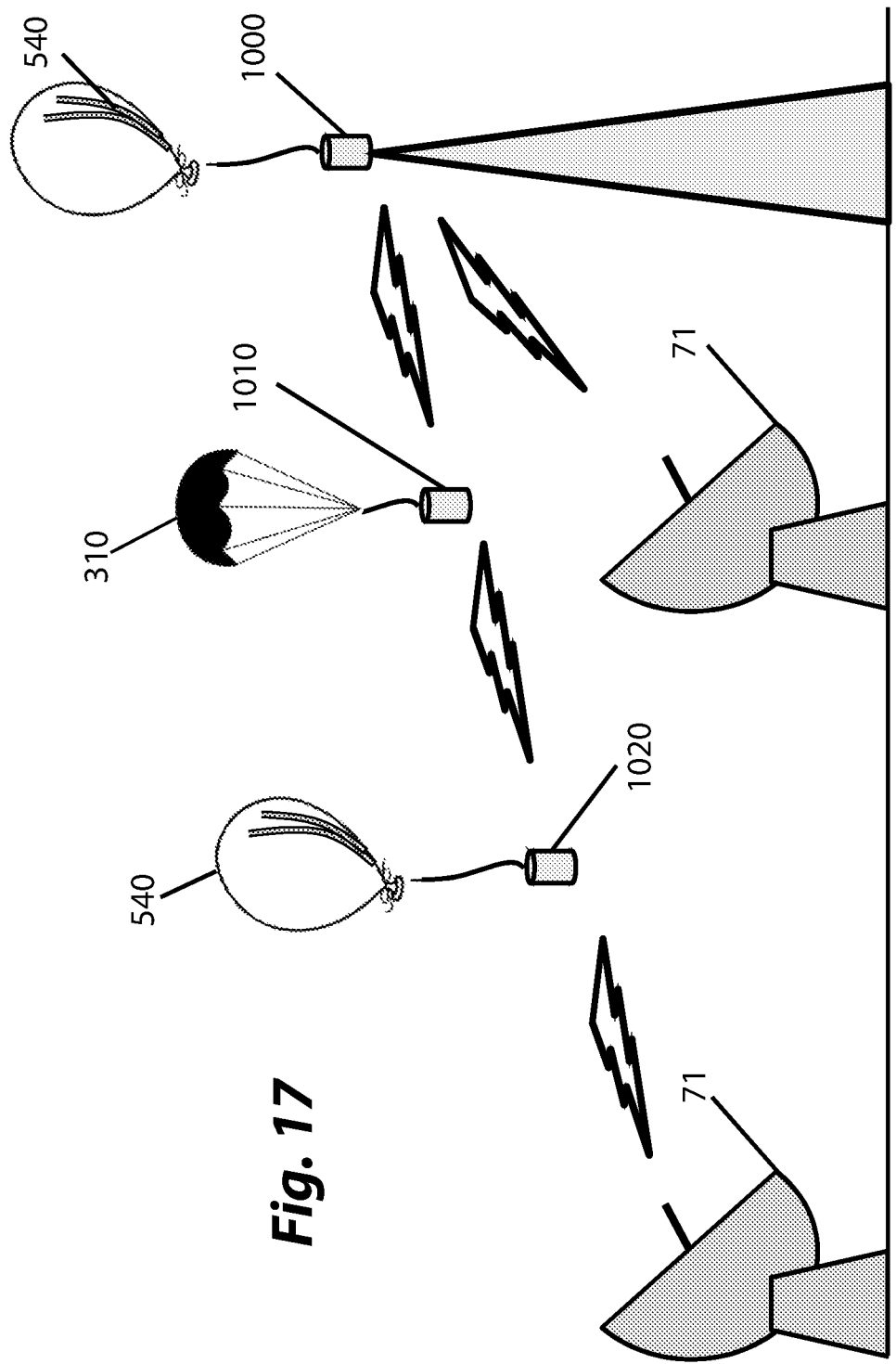

FIG. 6 schematically shows three modes of hooking and integration of the platform of FIG. 2 in the launch train (or flight train) of weather balloons;

FIG. 7 schematically shows three modes of hooking and integration of two platforms of FIG. 2 in the launch train of weather balloons;

FIG. 8 schematically shows a launch train composed of three platforms of FIG. 2 in water at the end of flight;

FIG. 9 schematically shows a further mode of hooking and integration of the platform of FIG. 2 in a flight train of a weather balloon;

FIG. 10 shows an alternative arrangement wherein two platforms of FIG. 2 are hooked and integrated in a flight train of a weather balloon;

FIG. 11 shows an arrangement wherein three platforms of FIG. 2 are hooked and integrated in a flight train of a weather balloon;

FIG. 12 shows an arrangement wherein a platform of FIG. 5f and a platform of FIG. 2 are hooked and integrated in a flight train of a weather balloon;

FIG. 13 shows four flight phases of an arrangement comprising the platform of FIG. 2 and an ascent trajectory control passive apparatus;

FIG. 14 shows the communication systems of the platform for photographic and/or video shots according to the invention;

FIG. 15 schematically shows the ground system of controlling and managing the data coming from one or more platforms for photographic and/or video shots according to the invention;

FIG. 16 schematically shows the use of a platform for photographic and/or video shots according to the invention for purposes of ship traffic control; and FIG. 17 schematically shows an example of how communications of a platform for photographic and/or video shots according to the invention occur.

In the Figures identical reference numerals will be used for alike elements.

In the following description, directional terminology, such as "right", "left", "front", "rear", "base", "top", "upper", "lower", "side", "vertical", "horizontal", etc., is used with reference to the Figures of the annexed drawings. Since components and/or elements and/or embodiments of the present invention may be positioned and/or operated in several different orientations, the directional terminology is used purely by way of example and not by way of limitation.

In the following reference will be made to embodiments of the platform configured to make acquisition of images and/or radio signals according to the invention, in particular for photographic and/or video shots and/or for receiving radio signals, optionally operating as bistatic radar receiver, comprising cameras, sensors and radio signal receivers. It must be understood that with the term camera it is intended any camera configured to acquire still and/or moving images, remaining within the scope of protection as defined by the attached claims.

FIG. 1 shows a first embodiment 100 of the platform for acquiring images and/or radio signals according to the invention, associated to the suspension cable 80 of a radiosonde 15. In particular, the platform 100 comprises a bobbin 3, preferably made of plastic material, having a hollow body, of substantially truncated cone shape; however, it must be noted that the shape of the hollow body of the bobbin 3 is not an essential feature of the invention, and that such shape may be any other conventional shape, for instance a cylindrical shape. The upper end of the hollow body is coupled to a hook 2, configured to be removably attached (e.g. hooked or tied) to a carrier weather balloon (not shown in FIG. 1); the bobbin 3 is configured so that the cable 80 of the radiosonde 15 may wind and unwind from the side wall of the hollow body of the same bobbin 3. The lower end of the hollow body of the bobbin 3 is coupled to a base 1 from which a camera 5 for photographic and/or video shots (or a different acquisition sensor, such as a radio signal receiver provided with an antenna, optionally operating as bistatic radar receiver) protrudes downwards, that is connected to a unit 10 for sensing the position as well as the direction (i.e. the aiming) of the camera 5. The hollow body of the bobbin 3 internally houses a control unit 6 and a battery 7 for supplying power to the electronic components; the control unit 6 is connected to the camera 5 (or to the radio signal receiver) and to the sensing unit 10, and it is provided with a processing device (e.g. a microprocessor), optionally configured to execute processing on sensed data received from the sensing unit 10, and with a radio communication device, connected to an antenna 600. The sensing unit 10 is optionally provided with a GPS sensor and at least one motion sensor (e.g. at least one accelerometer and/or at least one gyroscope); moreover, the sensing unit 10 could be also provided with a processing device (e.g. a microprocessor) configured to control the operation of the unit 10 and/or to execute processing of sensed data. The camera 5 (or a different acquisition sensor, such as a radio signal receiver), the sensing unit 10, the control unit 6 and the battery 7 are coupled to each other and are mechanically hooked to the hollow body of the bobbin 3 through a hook 8 that allows them to oscillate around two orthogonal axes (in FIGS. 1a and 1b the two oscillations around such two axes are indicated by the curvilinear lines indicated by the reference numerals 9A and 9B), so as to mitigate the transmission of the movements to which the bobbin 3 is subject, most of all during unwinding of the cable 80 of the radiosonde 15 immediately after the launch of the balloon, and to ensure image shooting (or radio signal acquisition) in a stable manner. FIG. 1b shows the radiosonde 15 in the state of partial unwinding of the cable 80, wherein a large part of the cable 80 is wound around the bobbin 3, while FIG. 1a shows the state of complete unwinding of the cable 80, wherein the latter is bound to an anchor side part 660. The processing device of the control unit 6 is configured to control and/or program, on the basis of the sensing data coming from the sensing unit 10 (and, in this case, it is not essential that the unit 10 is connected to the camera, or different acquisition sensor, 5 for exchanging data), the camera 5 for acquiring images (or a different acquisition sensor, such as a radio signal receiver provided with antenna) during the overflight of zones of interest and when rocking and oscillations to which it is subject have an amplitude and a velocity lower in absolute value than respective maximum values (whereby the oscillation amplitude is within a respective range of acquisition oscillation amplitude and the oscillation velocity is within a respective range of acquisition oscillation velocity) so that the actual aiming (i.e. the orientation) of the camera (or different acquisition sensor) 5 has an offset with respect to the ideal aiming at the target lower in absolute value than a respective maximum angular offset value (i.e. it is within a respective range of the acquisition aiming) and that the rate of aiming variation (i.e. the rate of variation of such angular offset) is lower in absolute value than a respective maximum value of rate of variation of the angular offset (i.e. it is within a respective range of rate of variation of acquisition aiming) so as to ensure focusing of the camera 5 (or focusing of the antenna of the radio signal receiver) on the aimed area; in other words, the processing device of the control unit 6 is configured to enable the acquisitions of the camera (or different sensor) 5 only when the actual aiming of the camera (or different acquisition sensor) 5 has an offset with respect to the ideal aiming at the target lower in absolute value than the maximum angular offset value and a rate of variation of the aiming lower in absolute value than the respective maximum value of rate of variation of the angular offset. In the case where the sensing unit 10 is provided with a processing device, the latter may be configured to control and/or program, on the basis of the sensing data sensed by the same sensing unit 10, the camera (or a different acquisition sensor, e.g. a radio signal receiver provided with antenna) 5 in a similar manner. In particular, the rocking and oscillations of the camera (or a different acquisition sensor) 5 are usually due to the movements of the bobbin 3 mainly caused by the radiosonde 15, the winds and the movement of the carrier balloon.

Further embodiments of the platform according to the invention may have a fixed acquisition sensor aimed down and/or the sole criterion for enabling the acquisitions is that of the rate of variation of the angular offset, that must be lower in absolute value than the maximum value of rate of variation of the angular offset.

Other embodiments of the platform for acquiring images (i.e. for photographic and/or video shots) and/or radio signals according to the invention may have the acquisition sensor 5 (e.g. a camera or a radio signal receiver provided with antenna), the sensing unit 10, the control unit 6 and the battery 7 which, instead of being mechanically hooked to the hollow body of the bobbin 3 through the hook 8 as shown in FIG. 1, are coupled to an articulated frame, in turn coupled to a hook configured to be removably attached (e.g. hooked or tied) to a carrier weather balloon. Such articulated frame is advantageously provided with a bobbin configured so that the cable of a radiosonde may wind around and unwind from the same bobbin. Advantageously, the articulated frame may assume a closed configuration, so as to minimise the size of the frame and of the electronic components coupled thereto during the phase of ascent of the carrier weather balloon and the unwinding of the cable, and a deployed configuration, wherein the camera aims down (i.e. it has the optical axis oriented downwards) ensuring image shooting in a stable manner, optionally also by means of pins and/or hinges which allow it to rock so as to mitigate the transmission of the movements due to the movements of the articulated frame.

FIG. 2 shows three views of a second embodiment 200 of the platform for acquiring images (i.e. for photographic and/or video shots) and/or radio signals (e.g. radar signals) according to the invention, wherein in particular FIG. 2c shows a side view of the platform 200 of FIG. 2a connected to a drogue parachute 310 through a cable 320 in water 330 at the end of the flight trajectory. The second embodiment 200 of the platform according to the invention comprises a floating container 22, advantageously made of plastic and/or thermally insulating material and having cylindrical symmetry about a longitudinal axis 340 (though the material and the shape are not essential features of the invention). The floating container 22 is optionally composed of three substantially cylindrical parts coupled, optionally screwed, to each other: an upper component 201, having a first diameter, that contains the heaviest parts of the platform, such as for instance the batteries, besides a possible (though not essential) ballast; an intermediate component 202, having a second diameter longer than the first diameter, that contains sensors and processing unit; and a lower component 203, having a third diameter longer than the first one and shorter than the second one, coupled to a dome 31, that may be made of transparent material and advantageously having hemispherical shape; it must be noted that the dome 31 is not an essential feature of the invention and that other embodiments of the platform may be devoid thereof. Two additional components may optionally be part of the container: a floating hollow module 204 of cylindrical shape, optionally made of polystyrene or thermally insulating material, that surrounds part of the intermediate component 202 of the container of the platform and that may by surrounded by solar panels 50 semi-embedded in the material composing the floating hollow module 204 (e.g. polystyrene) in order to accumulate energy and recharge the batteries housed inside the upper component 201; and a propulsion module 205 composed of a circular ring provided with propellers 49 arranged in vertical and/or horizontal direction. As shown in FIG. 2c, at the end of the flight trajectory, in the case where the platform 200 is in water 330, it is arranged with the propellers 49 above the waterline due to the torque generated by the weight of the heaviest parts of the platform 200, such as for instance the batteries, housed in the upper component 201 and to the Archimedes' force due to the floating hollow module 204, whereby the centroid of the platform 200 is arranged below the waterline and the platform is naturally arranged in vertical position. In particular, the propellers 49, which are optionally orientable, may be usable both in air for controlling the flight trajectory and in water for moving the platform 200.

Figure 3:
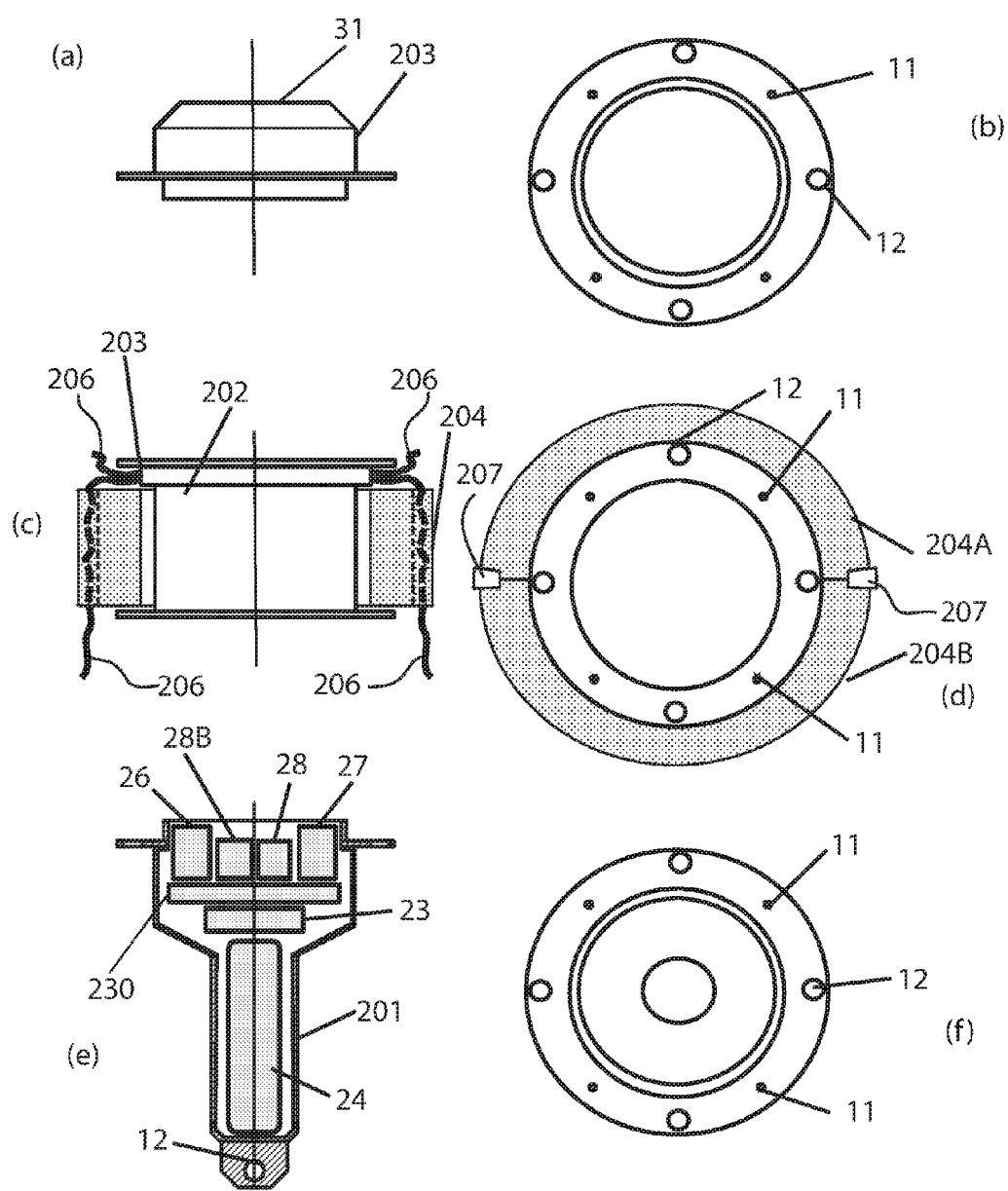
FIG. 3 shows a front view (FIG. 3a) and a top plan view (FIG. 3b) of a first element, a front view (FIG. 3c) and a top plan view (FIG. 3d) of a second element, and a front view (FIG. 3e) and a top plan view (FIG. 3f) of a third element of the platform of FIG. 2.

FIG. 3 shows in detail the main components forming the platform of FIG. 2: the lower component 203, coupled to a dome 31 (FIGS. 3a and 3b); the intermediate component 202 surrounded by the floating hollow module 204 (FIGS. 3c and 3d); the upper component 201 (FIGS. 3e and 3f).

The intermediate component 202 shown in FIGS. 3c and 3d is provided with apertures for the passage of electrical cables 206 to the outside for the connection and data transmission with possible external devices or other components. The floating hollow module 204 may be divided in two hemi-cylindrical parts 204A and 204B, shown in FIG. 3d, so as to facilitate its assembly around the intermediate component 202.

The upper component 201 shown in FIGS. 3e and 3f contains one or more batteries 24 for supplying power to the electronic components, a position and direction sensing unit 230 and a control unit 23 (provided with a processing device and a radio communication device); an antenna 26 for long range radio communication, an antenna 27 for satellite radio communication and an antenna 28 for mobile telephony (optionally along with an antenna 28B for short range radio communication to ground or other platforms according to the invention or other parts of the same platform 200) are connected to the radio communication device of the control unit 23.

The components shown in FIG. 3 are provided with first through holes 11 which allow such components to be screwed and assembled to each other for composing the floating container 22 of FIG. 2, that is closed and sealed. Moreover, the components shown in FIG. 3 are provided with second through holes 12 which allow supporting cables or rods to pass and be tied so as to permit the platform 200 to be suspended vertically upward, downward or horizontally, as shown in greater detail in the subsequent figures.

Figure 4:
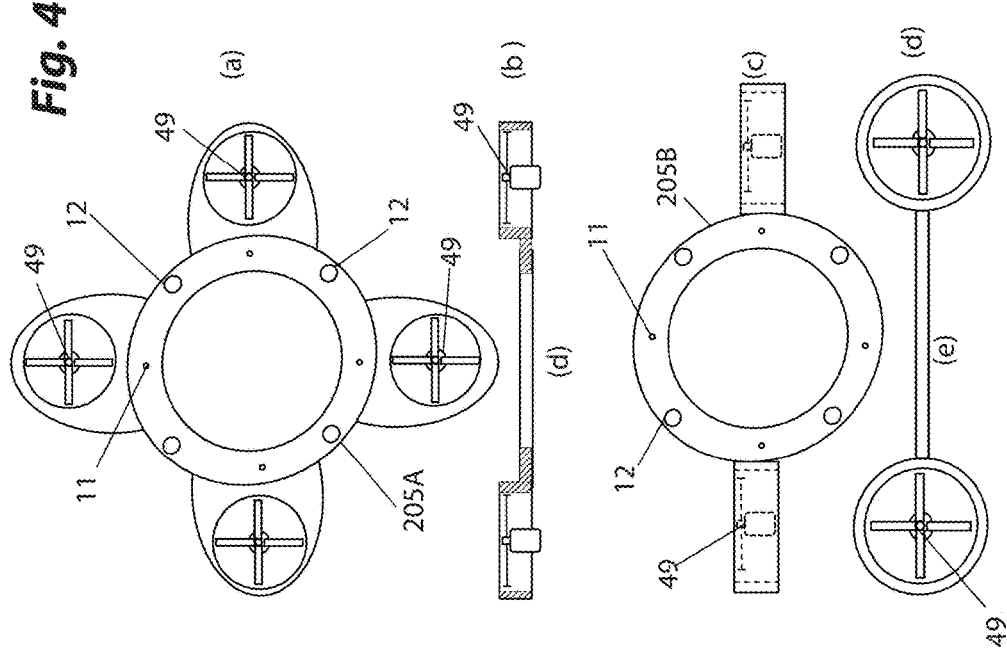
FIG. 4 shows a top plan view (FIG. 4a) and a front view (FIG. 4b) of a first variant and a top plan view (FIG. 4c) and a front view (FIG. 4d) of a second variant of a fourth element of the platform of FIG. 2.

FIG. 4 shows two variants of the propulsion module of further embodiments of the platform according to the invention. In particular, the propulsion module 205A shown in FIG. 4a is composed of four propeller units 49 with electric motors arranged in vertical orientation, so as to permit the control of oscillations (i.e. the control of the attitude) of the platform, to control its direction of flight and to permit the control of the ascent rate of the weather balloon. The propulsion module 205B shown in FIG. 4b is composed of two propeller units 49 with electric motors 49 arranged in horizontal orientation, so as to permit the control of the oscillations of the platform or to control its direction of flight. Other embodiments of the platform according to the invention may have a propulsion module comprising a combination of the modules 205A and 205B of FIGS. 4a and 4b, respectively, whereby such propulsion module comprises both propeller units 49 arranged in vertical orientation and propeller units 49 arranged in horizontal orientation.

Figure 5:
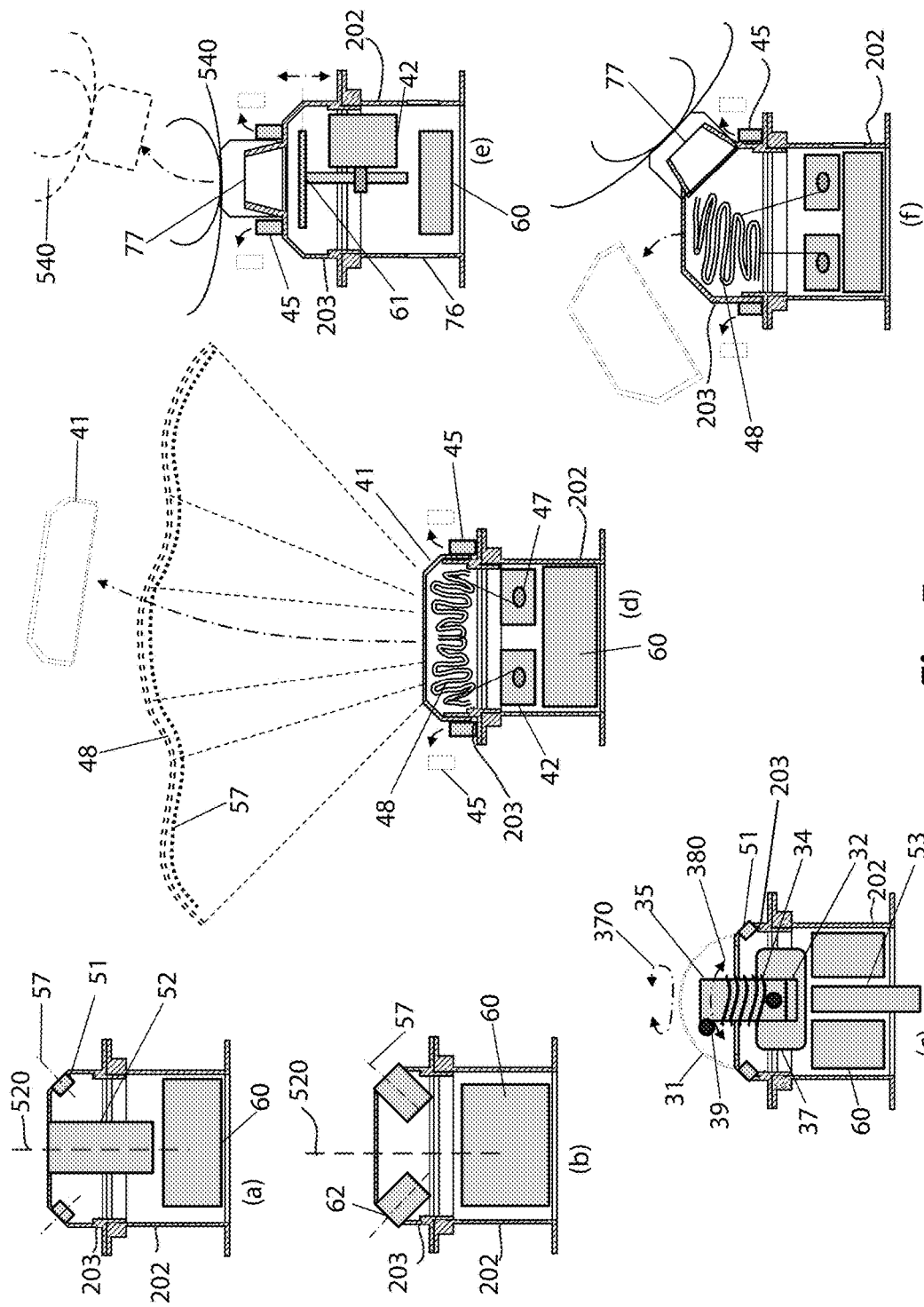
FIG. 5 shows partial side views of a third, a fourth, a fifth, a sixth, a seventh and an eighth embodiment of the platform for acquiring images and/or radio signals according to the invention.

FIG. 5 schematically shows the intermediate and lower components 202 and 203 of six further embodiments of the platform according to the invention, each one of which performs several tasks and may control the flight according to specific modes.

FIG. 5a shows the intermediate and lower components 202 and 203 of a third embodiment (particularly simple) of the platform according to the invention, comprising two or more perimetral panoramic cameras 51 and (at least) one camera 52 provided with zoom. The panoramic cameras 51 are oriented so that their main optical axis 57 is inclined with respect to the vertical line, i.e. with respect to a main optical axis 520 of the zoom camera 52 (parallel to, possibly coinciding with, the longitudinal axis 340 of the platform), and they are advantageously angularly equally spaced (i.e. regularly staggered) along the circumference of the lower component 203. As stated, the zoom camera 52 is preferably oriented with its own main optical axis oriented in vertical direction (parallel to, possibly coinciding with, a longitudinal axis of the platform). The panoramic cameras 51 advantageously have fields of view partially overlapping that of the zoom camera 52. The intermediate component 202 may contain an additional processing unit 60 that permit to select, as a function of the movement and oscillations to which the platform is subject, which camera (among the panoramic cameras 51 and the zoom camera 52) is beneficial to use, in particular depending on the platform position, the actual aiming of each camera and the related offset with respect to the ideal aiming at the target, and the rate of variation of the aiming of each camera, so as to enable the image acquisition by the cameras which are focused on an area containing or close to the target; in other words, the additional processing unit 60 enables only the panoramic cameras 51 and/or the zoom camera 52, the actual aiming of which allows the designated target to be shot and the intensity of oscillations still allows a sufficient focusing, to acquire images so as to automatically operate photographic shooting in optimal conditions.

FIG. 5b shows the intermediate and lower components 202 and 203 of a fourth embodiment of the platform according to the invention configured to make acquisition of radio signals so as to operate as a passive bistatic radar receiver. In particular, the lower component 203 comprises two or more radio signal receivers 62 provided with antennas the maximum gain electromagnetic axis (boresight) 57 of which is oriented in inclined position with respect to a longitudinal axis 340 of the platform and which are advantageously angularly equally spaced (i.e. regularly staggered) along the circumference of the lower component 203. In this case, the intermediate component 202 contains an additional processing unit 60 that permits to process the radio signals received from the antennas and to select which radio signal receiver 62 is beneficial to use, in particular depending on the platform position, the actual aiming of each receiver 62 and the related offset with respect to the ideal aiming at the designated target, and the rate of variation of the aiming of each receiver 62, so as to enable the radio signal acquisition by the receivers 62 which are focused on an area containing or close to the designated target; in other words, the additional processing unit 60 enables only those receivers 62, the actual aiming of which allows radio signals coming from the designated target to be acquired and the intensity of oscillations still allows a sufficient focusing, to acquire radio signals so as to automatically operate acquisition of radio signals, in particular for radio and/or radar measurements, in optimal conditions.

FIG. 5c shows the intermediate and lower components 202 and 203 of a fifth embodiment of the platform according to the invention configured to acquire images (e.g. for purposes of photographic shot) and/or radio signals, in particular radar signals, with continuous aiming. The lower component 203 is now provided with two (or more) fixed perimetral cameras 51 and a transparent dome 31, made of transparent material and advantageously having hemispherical shape, that houses the optical sensors that compose (at least) one central camera 32, as well as a main antenna 34, optionally a helicoidal one, of radio communication and/or reception of radio signals and/or radar signals that wraps around the optical zoom 35 of the central camera 32; in other words, the main antenna 34 operates as radio signal receiver. In particular, the central camera 32 is coupled to the optical zoom 35 that houses, embedded in its walls, the electrically conductive wire composing the main antenna 34 of radio communication and/or reception of radio and/or radar signal. The optical axes of the central camera 32 and of the perimetral cameras 51 are oriented in different directions staggered (i.e. not parallel) with respect to each other, so as to ensure a partial overlap of their wide fields of view. The central camera 32, through the optical zoom 35, has a higher magnification level and a field of view of lower amplitude than the perimetral cameras 51. The possibility of overlapping the images acquired by two cameras with zoom levels and points of view different from each other permits to use conventional processing software capable to compose single and wide images provided with field width and metric resolution higher than those which would be obtained through a single camera. Moreover, the control unit (not shown, similar to the unit 23 of FIG. 2) housed in an upper component (also not shown, similar to the component 201 of FIG. 2) and/or the additional processing unit 60 are capable to combine images captured in different instants by a single camera 32 or 51, or the single images acquired by two or more cameras 32 and/or 51 in the same instant or in different instants (provided that the respective fields of view are at least partially overlapping), in one single panoramic image and they may determine the exposure time and focusing of the camera, as well as determining instant and direction of the photographic shots on the basis of the position and aiming data given by the sensing unit (not shown, similar to the unit 21 of FIG. 2) of the platform during the flight; even the control unit of the platform 100 in FIG. 1 may execute such processing, although this is not an essential feature of the invention. The intermediate and upper components 202 and 201 further house an aiming unit 37, optionally comprising one or more mechanical actuators, controlled by the control unit (similar to the unit 23 of FIG. 2) housed in the upper component (similar to the component 201 of FIG. 2), configured to make the assembly of the central camera 32 and the antenna 34 execute respectively an azimuth movement and an elevation movement (schematically represented by the rotation directions 370 and 380); in particular, other embodiments of the platform according to the invention having a floating container coupled to a dome may have at least one part of the aiming unit 37 that is housed in the dome 31, rather than in the intermediate and upper components 202 and 201. The dome 31 may further house a Led optical communication terminal 39, also controlled by the control unit (not shown, similar to the unit 23 of FIG. 2). In particular, through the azimuth and elevation movements 370 and 380 it is possible to aim the central camera 32, the main antenna 34, besides the possible optical communication terminal 39, at a predetermined direction. A reaction wheel 53, housed in the intermediate component 202 and controlled by the control unit (similar to the unit 23 of FIG. 2) and/or the additional processing unit 60, allows the azimuth aiming of all the cameras 32 and 51. During the flight, the central camera 32 may be aimed both at ground and at the sky, thanks to the great freedom of aiming in elevation ensured by the aiming unit 37. As shown in FIG. 2c, at the end of the flight trajectory, conventionally braked by a parachute 310 connected through a cable 320 to the platform 200, in the case where the platform 200 is in water 330, the platform 200 is arranged with the longitudinal axis 340 in vertical direction with the dome 31 emerging from the water 330, due to the torque generated by the weight force of the batteries 24 and by the Archimedes' force of the floating container 22 and in particular of the floating hollow module 204. Thus, the platform 200 may ensure the image shot along the entire horizon line.

The antennas (and/or other radio sensors) of the radio signal receivers 62 of FIG. 5b and the main antenna 34 may be used for receiving radio signals at high frequency such as radio signals emitted by a radar antenna close to the operation theatre.

FIG. 5d shows the intermediate and lower components 202 and 203 of a sixth embodiment of the platform according to the invention that includes a system for releasing a driven parachute 48 that includes a removable dome 41 and a separation device composed of a removable ring 45. The driven parachute 48 is housed within the removable dome 41 and is ejected once the removable dome 41 has been removed during the phase of descent of the platform and hence it is pushed upward by aerodynamic force while one or more optional spring rods 570 may facilitate the opening of the parachute 48 even in low atmospheric pressure conditions and/or at high altitude. In particular, the removable dome 41 and the removable ring 45 after removal from the platform are shown in dashed lines in FIG. 5d. The intermediate component 202 houses two mechanical actuators 42 (each operating on a respective cable 47), a processing and control unit 60, advantageously provided with a processing device (e.g. a microprocessor); other embodiments of the platform according to the invention may have the intermediate component 202 that is provided with three or more, instead of two, mechanical actuators similar to those indicated with the reference numeral 42 in FIG. 5d. The processing and control unit 60, that controls the operation of the mechanical actuators 42, may also comprise its own sensing unit, optionally comprising a position sensor (e.g. a GPS sensor) and at least one motion sensor (e.g. at least one accelerometer and/or at least one gyroscope), that operates as inertial platform configured to derive the aiming direction and to reconstruct the flight trajectory; alternatively, the processing and control unit 60 may use the data sensed by the sensing unit (not shown, similar to the sensing unit 230 of FIG. 2) of the platform. The processing and control unit 60 further comprises a radio communication device configured to communicate with the sensing unit (similar to the sensing unit 230 of FIG. 2) through wired and/or wireless connection. The cables 47 of connection to the parachute 48 that is driven through the mechanical actuators 42 operating on the same cables 47 exit from the wall interposed between the intermediate component 202 and the lower component 203.

FIG. 5e shows the intermediate and lower components 202 and 203 of a seventh embodiment of the platform according to the invention that includes a valve that permits to deflate the carrier balloon 540 in a controlled manner; the valve is composed of a piston 61 that is moved by a servo actuator 425 to be lifted up to close the base of the balloon 540 or lowered down to permit the release of part of the gas through side apertures 76 of the intermediate component 202 (and/or similar apertures of the lower component 203). The balloon 540 is tight locked to a suitably sized collar 77 and it is released by opening a clamping collar 450; in particular, the carrier balloon 540 and the clamping collar 450 after removal from the platform are shown in dashed lines in FIG. 5e.

FIG. 5f shows the intermediate and lower components 202 and 203 of an eighth embodiment of the platform according to the invention wherein the two previous solutions, shown in FIGS. 5d and 5e, are integrated: a driven parachute 48 and a clamping collar 450 of the carrier balloon 77. The driven parachute 48 is released after the burst of the balloon 540 and without the latter being released or removed; in particular, the lower component 203 and the clamping collar 450 after removal from the platform are shown in dashed lines in FIG. 5f.

FIG. 6 shows three modes of fastening and integrating the platform 200 of FIG. 2 in the launch train of weather balloons, wherein the platform is fastened through cables 500 to a carrier balloon 540 with its own longitudinal axis 340 oriented in a first vertical direction (FIG. 6a) or in horizontal direction (FIG. 6b) or in a second vertical direction opposed to the first one (FIG. 6c).

FIG. 7 shows some possible ways of integrating two platforms 200 and 200', as those of FIG. 2, through supporting cables 500 in a same flight train of a weather balloon 540: in FIG. 7a the two platforms 200 and 200' are fastened with their own longitudinal axes 340 and 340' oriented in the second and first vertical direction, respectively; in FIG. 7b the two platforms 200 and 200' are fastened with their own longitudinal axes 340 and 340' oriented in the horizontal direction and in the first vertical direction, respectively; in FIG. 7c the two platforms 200 and 200' are fastened with both their own longitudinal axes 340 and 340' oriented in the first vertical direction. The fastening mode of the two platforms 200 and 200' may be decided on the basis of the task that the platforms must perform (e.g. soil or sky shooting or flight control through driven parachute). In particular, the two platforms 200 and 200' may communicate with each other through electrical cables passing through suitable apertures as mentioned with reference to FIGS. 3c and 3d or communicate through short range wireless radio connection, and in this case optionally only one of the two platforms 200 and 200' is provided with a long range communication system capable to connect with ground control stations.

FIG. 8 shows a launch train composed of three platforms 200, 200' and 200" in water at the end of flight, wherein all the platforms are arranged in vertical orientation with the lower component 203 provided with the image and/or radio signal and/or radar signal acquisition sensors (and the possible propulsion module, not shown) above the waterline.

FIG. 9 shows a further mode of fastening the platform 200 of FIG. 2 to a flight train of a weather balloon 540, wherein the upper component 201 is provided with a mechanical element 220, advantageously a protruding ring, configured to interact with a hook 150, coupled to a bobbin 160 configured so that a cable 170 of suspension of a radiosonde 15 may wind around and unwind from the same bobbin 160; in FIG. 9, the cable 170 is shown completely unwound from the bobbin 160. The drogue parachute 55 is advantageously housed within the carrier balloon 540, and it is extended in a natural and automatic way at the burst of the latter.

FIG. 10 shows an alternative arrangement comprising two platforms 200 and 200' (fastened similarly to FIG. 7a), wherein the drogue parachute 55 (that may be composed of a semi-rigid plate) is arranged at the base of the carrier balloon 540 in already extended configuration; in this case, a release or separation device 56, of pyrotechnic or mechanical or hot wire type, controlled through timer or through remote controls sent by the platform 200 (or by a ground station), is arranged between the top of the parachute 55 and the base of the carrier balloon 540 (FIG. 10a) and it is configured to ensure the release of the parachute 55 from the balloon 540 (FIG. 10b). The parachute 55 (that, as stated above, may be composed of a semi-rigid plate) may slow down the descent of the platforms 200 and 200' down to ground or it may act as driven parachute and it may be sized for permitting an only partial slowdown during the descent and for stabilising the oscillations of the platforms 200 and 200' so as to permit the deployment of a driven parachute 48 of larger size, as indicated in FIG. 10c. The drogue parachute 55 may be in turn released or it may remain suspended from the driven parachute 48 through a suspension cable 79. In fact, the platform 200 (that in the flight train is fastened in proximity to the carrier balloon 540) may have the task of providing for the deployment of the driven parachute 48 while the platform 200' (that in the flight train is fastened at a larger distance from the carrier balloon 540) is provided with the acquisition sensors, such as cameras and/or radio signal receivers, needed for the mission. Obviously, should the means for manoeuvring the trajectory of the platform 200 act on the cables of connection to the drogue parachute 55 and/or driven parachute 48, (at least some) cables of connection to the drogue parachute 55 and/or driven parachute 48 exit from the intermediate component of such platform 200.

FIG. 11 shows an arrangement wherein three platforms 200, 200' and 200" of FIG. 2 are connected in the flight train of a weather balloon 540 through cables 500. The upper platform 200 is provided with a system of valves for permitting the balloon 540 to deflate in a controlled manner, similarly to what illustrated with reference to FIG. 5e. As shown in FIG. 11a, during the flight the intermediate platform 200' is arranged with the longitudinal axis 340 oriented in horizontal direction and provides for the deployment of a drogue parachute 55 as illustrated for FIG. 10. As shown in FIG. 11b, after release of the balloon 540, the intermediate platform 200' is arranged with the longitudinal axis 340 oriented in the second vertical direction (i.e. with the lower component 203 upwards), supporting the other two platforms 200 and 200" below; in particular, as shown in FIG. 11c, the three platforms may release the domes and/or most part of the lower components 203.

FIG. 12 shows an arrangement wherein a first platform 200 incorporates a piston valve and a drogue parachute 55, similarly to what illustrated with reference to FIG. 5f, so as to permit the control of ascent and descent, and a second platform 200' is also fastened in the flight train of a carrier balloon 540 through cables 500. As shown in FIG. 12a, resistors 81 glued to the balloon 540, when supplied, heat the cloth of the balloon 540 up to its break, causing its burst. As shown in FIG. 12b, the balloon 540, after the burst, remains fastened to the module 200 for allowing its later recovery if necessary and thus reducing problems related to pollution. As shown in FIG. 12c, after the burst of the balloon 540, the drogue parachute 55 stabilises the descent of the platforms 200 and 200' and supports the extraction of a driven parachute 48.

FIG. 13 shows the phases of flight of an arrangement wherein one or more platforms 200 according to the invention, as that shown in FIG. 2, are provided with apparatuses for controlling the ascent and descent trajectories. In particular, as shown in FIG. 12a, such arrangement comprises a platform 200 connected to a second platform 200' through a cable 420, and to a cable 170 of suspension of a radiosonde 15, where the cable 170 unwinds from a respective bobbin 160 fastened to the platform 200 (however, the bobbin 160, the cable 170 and the radiosonde 15 are not essential features of the invention and the arrangement of FIG. 13 could be also devoid thereof); the upper platform 200 is attached to the base of the carrier balloon 540 through a release device (not shown in FIG. 13) as those illustrated in FIGS. 5e and 5f. A control passive apparatus may be connected between the carrier balloon 540 and the upper platform 200 that, through a cross structure 620, made by means of rods and cables of suspension, comprises a first pair of auxiliary heavy balloons 63 at least partially inflated, optionally by less than 50% of volume (in any case optionally of a small quantity), with a heavy gas, such as for instance carbon dioxide or nitrogen, and possibly filled with ballast, e.g. sand or grains of lead, and a second pair of auxiliary light balloons 64 at least partially inflated, optionally by more than 50% of volume (in any case optionally almost fully), with the same light gas used for the carrier balloon 540, e.g. helium or hydrogen; it must be noted that other embodiments of the platform according to the invention may be provided with a control passive apparatus comprising a number of auxiliary heavy balloons (similar to those indicated with the reference numeral 63) different from two, in particular one or three or more, and/or comprising a number of auxiliary light balloons (similar to those indicated with the reference numeral 64) different from two, in particular one or three or more. The auxiliary balloons 64 and 63 may be provided with independent release devices 640 and 630, so as to permit their controlled separation from the flight train. It is important to note that by suitably inflating the heavy balloons 63 in a modest way and the light balloons 64 in a full way and by not making use of flexible and special plastic materials capable to resist to the low temperatures of the tropopause of which the balloons for radiosondes are made, the auxiliary heavy balloons 63 explode at a flight altitude higher than that of explosion of the auxiliary light balloons 64 and in any case always lower than that of explosion of the carrier balloon 540. During the first phase of flight, illustrated in FIG. 13a, the arrangement rises with the typical ascent rate of the weather balloons (4-7 m/s), because the combination of the effects of the auxiliary balloons 63 and 64 is null. Once the medium altitude of flight has been reached, the auxiliary light balloons 64 are separated through the release devices 640 (or they explode), as shown in FIG. 13b, reducing the ascent rate by 10-30% due to the weight of the auxiliary heavy balloons 63. Other embodiments according to the invention may be provided with the valve system illustrated in FIG. 5e alternatively or along with the auxiliary balloons so as to permit the exit of part of the gas of the main carrier balloon and to permit the slowdown and possibly the zeroing of the ascent rate of the platforms 200 and 200'. Once the upper altitude has been reached, also the auxiliary heavy balloons 63 are separated through the release devices 630 (or they explode), as shown in FIG. 13c, restoring the original ascent rate of the arrangement. Other embodiments according to the invention may be provided with a system of releasing ballast alternatively or along with the auxiliary balloons so as to permit the increase of the ascent rate. At the burst of the carrier balloon 540, the descent of the platforms 200 and 200' begins with the driven parachute 48 that is driven by the upper platform 200, as shown in FIG. 13d. In this way it is possible to obtain a flight profile, schematically shown by the dashed line 680 of FIG. 13, more favourable for the photographic and/or video shots and/or for radio signal acquisition, with the platforms 200 and 200' remaining at low and intermediate altitude up to 20 km for a longer time, thus allowing a prolonged territorial monitoring. During the descent of the parachute 48, the upper platform 200 controlling the trajectory is capable to ensure the overflight of predetermined areas.

The platform according to the invention may be advantageously launched through weather balloon launching systems of the type disclosed in document US 2005/0006523 A1 based on inflatable chambers usable when small dimensions, transportability and low observability are required, as on board of small watercrafts.

FIG. 14 shows the communication systems of the platform for acquiring images and/or radio signals according to the invention. Communications occur on a maximum of six different channels. The first communication channel 65 is a generally unidirectional channel, having high frequency (800-5800 MHz), medium band (at least 128 kbps) and medium range (about 50 km). The ground antenna 66 is strongly directive and is aimed at the platform according to the invention, indicated with the reference numeral 1000, so as to permit the correct reception of data. The second communication channel 67, that may be bidirectional, has medium frequency (300-500 MHz, when possible the same used by the radiosondes), medium band (about 32 kbps) and long range (beyond 250 km) so as to cover the entire typical range of action of a radiosonde. The ground antenna 68 is omnidirectional or weakly directive for ensuring the reception of primary data (position and speed) on the ground with no need for an accurate aiming. The third communication channel 69 makes use of a satellite bidirectional communication channel system with full coverage and low band, based on one or more satellites 690. The fourth communication channel 70 is a WiFi system with high-speed (higher than 1 Mbps) and very short range (shorter than 1 km). The fifth communication channel uses a broadband unidirectional LED optical communication system, employing a plurality of platforms 1000 networked to each other, based on Led optical communication terminals of the platforms (similar to that indicated with the reference numeral 39 in FIG. 2) and on the on-board mechanical devices (similar to the mechanical actuators indicated with the reference numerals 37 and 38 in FIG. 2) which perform the correct aiming of the terminals; such solution, that has been proposed so far for permitting internet coverage services in remote areas, used for aerial shooting purposes permits the transmission of images and video beyond the line of sight. At least one among the first, second, third and fourth communication channel is bidirectional so as to permit a possible reprogramming of the control unit of the platform 1000 from ground. A sixth communication channel (not shown in the Figures) allows the platform according to the invention to receive (and/or possibly transmit) marine radar signals. It must be noted that the communication systems of the platform for photographic and/or video shots according to the invention may comprise only one or some of the five channels illustrated with reference to FIG. 14.

FIG. 15 schematically shows the ground system of controlling and managing the data. This is composed of at least one station (schematically shown with an antenna) 71 capable to communicate with one or more platforms 1000 for acquiring images and/or radio signals according to the invention through the available communication channels and a ground computing centre 72 capable to process the received data and to predict the trajectories so as to define in advance the overflown areas and to arrange a system of notification of the next overflight to ground stations, control centres and/or interested users present in the overflown areas. The prediction of trajectory computed on the ground before the flight, possibly updated during the flight on the basis of the current position of the platform and of more recent predictions of winds and meteorological conditions, may be communicated to the control unit of the platform before the launch and/or during the flight, so as to program a sequence of acquisition (e.g. of image shot) on specific areas of the soil or the sky during the flight and to define a list of targets to shoot at specific altitudes and/or positions. In particular, the ground computing centre 72 may be used, along with the communication station 71, for reprogramming the aiming of the acquisition sensors (i.e. cameras and/or radio signal receivers) of a platform 1000 during the flight so as to acquire images or radio signals coming from a specific target not included among those defined and required before the launch. It is also possible to set from ground and on board the variation of the acquisition parameters (e.g., in the case of image shot, parameters such as focus and exposure) on the basis of the analysis of the just received acquisitions and of the predicted trajectory. In fact, it is possible to arrange both on board and on the ground complex software of analysis of the acquisitions (e.g. of the images) capable to determine the best operation parameters of the acquisition sensor (e.g. the camera), exploiting from ground the computing capabilities of the centre 72, which are higher than those available on board of the platform 1000, and a human intervention. Such parameters are computed and communicated to the platform 1000 in order to apply them during the flight.

FIG. 15 also shows a mode of use that has the simultaneous launch of multiple carrier balloons 540 and respective platforms 1000, so as to permit the acquisition of images and/or radio signals of the same zone 1050 but from different points of view and the generation of digital models of the terrain. To this end, a plurality of ground stations 71 are arranged while a general computing centre 720 has the task of integrating the data simultaneously or successively acquired by different platforms 1000. Moreover, the computing centres 72 may render the images and/or radio signals and/or data acquired by the platforms 1000 available on the Internet and/or on the cellular network 1100, for instance for their sending to a mobile terminal 1200 of an operator 1300.

FIG. 16 discloses a possible scheme of use of a platform for acquiring images and/or radio signals according to the invention (e.g. for photographic and/or video shots) for purposes of ship traffic control and identification of objects in the sea (e.g. pollutants and oil spills), wherein the platform is launched from ground or sea (e.g. on board of a patrol ship). A target watercraft 1400 is identified by a platform according to the invention during the ascent phase (schematically shown by the position indicated with reference numeral 73) through the acquisition and analysis of the images taken by the same platform or the reception of the radar signal emitted by an external antenna 700 and reflected by the watercraft (the reference numerals 710 and 715 indicate the emitted signal and the reflected signal, respectively). Afterwards, the platform according to the invention perform the overflight of the target watercraft 1400 during the ascent phase (schematically shown by the position indicated with the reference numeral 74) through the use of the driven parachute 310, and finally the platform according to the invention descends into the sea 330 in a position (indicated with the reference numeral 75) that permits the interception of the target watercraft 1400 and its close inspection. To this end, the platform according to the invention makes use of a light casing capable to permit the floating and the aiming of the cameras upward, similarly to what illustrated for the platform 200 of FIG. 2.

The radiosonde 15, with which the platform may be optionally provided, performs its usual role of measurement for meteorological purposes in air during the ascent and descent of the platform (of which reference numerals 73 and 74 indicate the positions in different instants), while it may perform the task of measurement of the current temperature and analysis of the components dissolved in water at the end of the descent (the reference numeral 75 indicates the position of the platform in water). Such measurement in water may be performed at 5-20 meters below the sea level since the sonde is not provided with floats but it is suspended from a cable bound to the platform.

As shown in FIG. 17, in the case where broadband or optical communication systems are used, the images or radio signals acquired by a platform 1000 during the ascent phase through a carrier balloon 540 may be directly communicated to ground to a receiving station 71 directly or through other platforms 1010 (during the descent phase through a driven parachute 310) and 1020 (during the ascent phase through a carrier balloon 540). This system permits the arrangement of a network of platforms according to the invention capable to control a geographical area even beyond the line of sight of the receiving station 71, similarly to what provided for the internet coverage of remote areas through stratospheric balloons.

In particular, a radio sensor capable to perform tasks of bistatic radar receiver sending to ground the radio signal generated by an external source (e.g. coastal radar, satellite) and reflected by an object in the sea or on the soil (e.g. aircraft, oil spill) as it is received by one or more antennas on board of the platform suitably aimed at a specific direction according to the invention, after possible processing and/or sampling, but reducing weights and complexity of the equipment on board of the platform, may be for instance that disclosed by M. May et al. in "Applications of Digital Storage Receivers for Enhanced Signal Processing", Proceedings of ION GPS '99, September 1999, Nashville, Tenn., and by A. Matini et al. in "Wind Profile Estimation Using a TIDGET™ Payload on Weather Balloons", Annual meeting, 52nd, Institute of Navigation, 1996, Cambridge, Mass., and in documents U.S. Pat. Nos. 5,379,224 A and 4,754,283 A.

The preferred embodiments of this invention have been described and a number of variations have been suggested hereinbefore, but it should be understood that those skilled in the art can make other variations and changes without so departing from the scope of protection thereof, as defined by the attached claims.

The invention claimed is:

1. Platform configured to acquire one or more between images and radio signals and to be carried by lightweight aviation aircrafts selected from the group comprising carrier balloons, weather balloons, small tethered balloons, and hot air balloons, wherein the platform comprises housing means that houses one or more acquisition sensors selected from the group comprising cameras configured to acquire one or more between still and moving images and radio signal receivers configured as passive bistatic radar receivers to receive and acquire radio signals, said housing means being configured to be coupled to a light aviation aircraft and being configured to meet weight and technical constraints provided for weather balloons according to international regulations, said one or more acquisition sensors being connected to processing means configured to receive sensing data from a position and motion sensing unit coupled to said one or more acquisition sensors, said processing means being configured to control and/or program, on the basis of the received sensing data, each acquisition sensor so as to enable the same to acquire one or more between images and radio signals when such acquisition sensor is in a determined position and is subject to oscillations having a velocity measured by said position and motion sensing unit that is not larger in absolute value than a maximum oscillation velocity value, whereby a rate of variation of an actual aiming of such acquisition sensor is not larger in absolute value than a respective maximum value of rate of variation of offset with respect to an ideal aiming at a target, so as to ensure focusing of such acquisition sensor on an aimed area, wherein said housing means comprises a floating sealed container, including a first end component, an intermediate component, and a second end component, housing said one or more acquisition sensors, the first and second end components being coupled to the intermediate component, the floating container having a weight distribution configured so that when the floating container is in water it is arranged with said one or more acquisition sensors above a waterline of the floating container, the acquisition sensors being usable for continuing the acquisition after the end of the flight.

2. Platform according to claim 1, wherein said processing means is configured to control and/or program, on the basis of the received sensing data, each acquisition sensor so as to enable the same to acquire images and/or radio signals when such acquisition sensor is further subject to oscillations having an amplitude that is not larger in absolute value than a maximum oscillation amplitude value, whereby said actual aiming of such acquisition sensor has an offset with respect to said ideal aiming at the target that is lower in absolute value than a respective maximum offset value.

3. Platform according to claim 1, further including a propulsion module provided with one or more thrusters, configured to control a flight attitude and/or a direction of flight and/or an ascent rate of the platform when carried by lightweight aviation aircrafts, and/or a route in water when the platform is in water.

4. Platform according to claim 3, wherein said thrusters are orientable propellers.

5. Platform according to claim 1, wherein the propulsion module comprises a circular ring provided with said one or more thrusters, said weight distribution of the floating container being configured so that when the floating container is in water it is arranged with said one or more thrusters which are arranged above said waterline of the floating container.

6. Platform according to claim 1, wherein said housing means houses one or more sensors selected from:
- two or more first cameras configured to acquire still and/or moving images oriented so that their main optical axes are tilted with respect to a longitudinal axis of the platform,
- one or more radio signal receivers configured to acquire radio signals, comprising direct and reflected radar signals, which are provided with respective antennas which are oriented so that their maximum gain electromagnetic axes are tilted with respect to a longitudinal axis of the platform,
- at least one central camera configured to acquire still and/or moving images that is oriented so that its main optical axis is parallel to a longitudinal axis of the platform,
- a radiosonde that carries out its usual role of measurement for meteorological purposes in air during ascent and descent of the platform and/or measurement of current temperature and analysis of components dissolved in water at the end of the descent in water at and/or below sea level.

7. Platform according to claim 1, wherein said housing means houses two or more cameras configured to acquire still and/or moving images which are arranged so that their respective fields of view partially overlap, said processing means being configured to combine images acquired in different instants by a camera and/or images acquired by said two or more cameras in the same instant and/or in different instants in one single panoramic image.

8. Platform according to claim 1, further comprising mechanical actuator means configured to be controlled by said processing means for modifying an aiming of said one or more acquisition sensors.

9. Platform according to claim 1, wherein said housing means also comprises a system for releasing a driven parachute that includes a removable dome and a separation device configured to be controlled by said processing means for separating the removable dome from said housing means, wherein the driven parachute is configured to be driven by flight trajectory maneuvering means configured to be controlled by said processing means.

10. Platform according to claim 1, wherein said housing means also comprises a valve configured to be controlled by said processing means for deflating a carrier balloon operating as light aviation aircraft configured to carry the platform.

11. Platform according to claim 1, provided with an ascent trajectory control passive apparatus, the ascent trajectory control passive apparatus being configured to be coupled to a light aviation aircraft, the ascent trajectory control passive apparatus comprising a cross structure comprising one or more auxiliary heavy balloons configured to be at least partially inflated with a heavy gas, and one or more auxiliary light balloons configured to be at least partially inflated with a light gas, the ascent trajectory control passive apparatus being configured to lose said one or more auxiliary heavy balloons at a flight altitude higher than that at which it is configured to lose said one or more auxiliary light balloons.

12. Platform according to claim 1, wherein said housing means comprises a bobbin having a hollow body, coupled to a hook configured to be removably coupled to a light aviation aircraft, the bobbin being configured to wind and unwind a suspension cable of a radiosonde, the bobbin housing said one or more acquisition sensors, said processing means and the position and motion sensing unit being coupled to each other and mechanically hooked to the hollow body of the bobbin.

13. Platform according to claim 1, further comprising at least one radio communication device connected to at least one antenna and configured to be controlled by said processing means, said at least one radio communication device being configured to make communications with at least one ground and/or flying station on one or more communication channels selected from the group comprising:
- a first unidirectional or bidirectional communication channel having high frequency, medium band, and medium range,
- a second unidirectional or bidirectional communication channel having medium frequency, medium band, and long range,
- a third satellite bidirectional communication channel,
- a fourth high-speed wifi communication channel, and very short range,
- a fifth marine radar signal receiving channel,
- wherein at least one of said one or more communication channels is bidirectional.

14. System of monitoring at least one area, comprising one or more platforms, wherein each platform is configured to acquire images and/or radio signals and to be carried by lightweight aviation aircrafts selected from the group comprising carrier balloons, weather balloons, small tethered balloons, and hot air balloons, wherein each platform comprises housing means that houses one or more acquisition sensors selected from the group comprising cameras configured to acquire one or more between still and moving images and radio signal receivers configured as passive bistatic radar receivers to receive and acquire radio signals, said housing means being configured to be coupled to a light aviation aircraft and being configured to meet weight and technical constraints provided for weather balloons according to international regulations, said one or more acquisition sensors being connected to processing means configured to receive sensing data from a position and motion sensing unit coupled to said one or more acquisition sensors, said processing means being configured to control and/or program, on the basis of the received sensing data, each acquisition sensor so as to enable the same to acquire one or more between images and radio signals when such acquisition sensor is in a determined position and is subject to oscillations having a velocity measured by said position and motion sensing unit that is not larger in absolute value than a maximum oscillation velocity value, whereby a rate of variation of an actual aiming of such acquisition sensor is not larger in absolute value than a respective maximum value of rate of variation of offset with respect to an ideal aiming at a target, so as to ensure focusing of such acquisition sensor on an aimed area, wherein said housing means comprises a floating sealed container, including a first end component, an intermediate component, and a second end component, housing said one or more acquisition sensors, the first and second end components being coupled to the intermediate component, the floating container having a weight distribution configured so that when the floating container is in water it is arranged with said one or more acquisition sensors above a waterline of the floating container, the acquisition sensors being usable for continuing the acquisition after the end of the flight, wherein each platform further comprises at least one radio communication device connected to at least one antenna and configured to be controlled by said processing means, wherein the system further comprises at least one ground and/or flying station configured to communicate with said at least one radio communication device of each platform, on one or more communication channels selected from the group comprising:

a first unidirectional or bidirectional communication channel having high frequency, medium band, and medium range, a second unidirectional or bidirectional communication channel having medium frequency, medium band, and long range, a third satellite bidirectional communication channel, a fourth high-speed wifi communication channel, and very short range, a fifth marine radar signal receiving channel, wherein at least one of said one or more communication channels is bidirectional, wherein the system comprises a computing centre, configured to process and integrate data acquired by said one or more platforms.

* * * * *